US012640859B2

(12) United States Patent
Khoshnevisan et al.

(10) Patent No.: US 12,640,859 B2
(45) Date of Patent: May 26, 2026

(54) DOWNLINK SCHEMES FOR A COOPERATIVE USER EQUIPMENT WITH JOINT BASEBAND PROCESSING

(71) Applicant: QUALCOMM Incorporated, San Diego, CA (US)

(72) Inventors: Mostafa Khoshnevisan, San Diego, CA (US); Aleksandar Damnjanovic, Del Mar, CA (US); Xiaoxia Zhang, San Diego, CA (US); Tao Luo, San Diego, CA (US); Jing Sun, San Diego, CA (US); Fang Yuan, Beijing (CN); Yitao Chen, San Diego, CA (US); Juan Montojo, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 753 days.

(21) Appl. No.: 18/001,376

(22) PCT Filed: Aug. 24, 2020

(86) PCT No.: PCT/CN2020/110758
§ 371 (c)(1),
(2) Date: Dec. 9, 2022

(87) PCT Pub. No.: WO2022/040850
PCT Pub. Date: Mar. 3, 2022

(65) Prior Publication Data
US 2023/0246756 A1 Aug. 3, 2023

(51) Int. Cl.
*H04L 5/00* (2006.01)
*H04W 8/22* (2009.01)

(52) U.S. Cl.
CPC .......... *H04L 5/0035* (2013.01); *H04L 5/0091* (2013.01); *H04W 8/22* (2013.01)

(58) Field of Classification Search
None
See application file for complete search history.

(56) References Cited

U.S. PATENT DOCUMENTS

| | | | | |
|---|---|---|---|---|
| 11,411,668 B2 * | 8/2022 | Wang | .................... | H04L 1/0046 |
| 11,889,585 B2 * | 1/2024 | Zhang | ................... | H04L 5/0035 |

(Continued)

FOREIGN PATENT DOCUMENTS

| | | |
|---|---|---|
| CN | 101882979 A | 11/2010 |
| WO | WO-2013100602 A1 | 7/2013 |

OTHER PUBLICATIONS

International Search Report and Written Opinion—PCT/CN2020/110758—ISA/EPO—Jun. 2, 2021.

*Primary Examiner* — Otis L Thompson, Jr.
(74) *Attorney, Agent, or Firm* — Norton Rose Fulbright US LLP

(57) ABSTRACT

Downlink schemes are disclosed for a cooperative user equipment (UE) with joint baseband processing. UEs may establish a cooperative UE unit with one or more neighboring UEs, where one of the UEs operates as the primary UE. The participating UEs of the cooperative UE unit determine a downlink transmission scheme for the cooperative transmissions from a serving base station and receive cooperative transmissions of one or more transport blocks from the serving base station according to the downlink transmission scheme. The secondary UEs of the cooperative UE unit generate and transmit cooperative process data to the primary UE, where the cooperative process data is based on the receipt of the cooperative transmissions by the secondary UEs. The primary UE processes its received cooperative transmission along with the cooperative process data to decode the one or more transport blocks. Other aspects and features are also claimed and described.

29 Claims, 11 Drawing Sheets

(56) References Cited

U.S. PATENT DOCUMENTS

| | | | | |
|---|---|---|---|---|
| 12,028,129 | B2 * | 7/2024 | Xu | H04B 7/0404 |
| 2012/0127949 | A1 * | 5/2012 | Yoshimoto | H04L 1/0077 |
| | | | | 370/328 |
| 2013/0039349 | A1 * | 2/2013 | Ebrahimi Tazeh Mahalleh | H04L 5/0048 |
| | | | | 370/336 |
| 2013/0107851 | A1 | 5/2013 | Park et al. | |
| 2013/0315189 | A1 * | 11/2013 | Kim | H04L 1/0026 |
| | | | | 370/328 |
| 2013/0322376 | A1 * | 12/2013 | Marinier | H04L 1/0027 |
| | | | | 370/329 |
| 2014/0112247 | A1 * | 4/2014 | Chen | H04W 28/18 |
| | | | | 370/328 |
| 2014/0169239 | A1 | 6/2014 | Maaref et al. | |
| 2014/0177456 | A1 * | 6/2014 | Boudreau | H04L 1/0003 |
| | | | | 370/252 |
| 2015/0016425 | A1 * | 1/2015 | Cui | H04L 1/0026 |
| | | | | 370/332 |
| 2015/0082133 | A1 * | 3/2015 | Cao | H03M 13/612 |
| | | | | 714/807 |
| 2016/0013889 | A1 | 1/2016 | Cao et al. | |
| 2016/0087694 | A1 * | 3/2016 | Vilaipornsawai | H04L 5/0016 |
| | | | | 370/329 |
| 2016/0219578 | A1 * | 7/2016 | Lim | H04B 7/026 |
| 2018/0145805 | A1 * | 5/2018 | Maaref | H04W 4/80 |
| 2019/0357305 | A1 * | 11/2019 | Su | H04W 88/04 |
| 2020/0068387 | A1 * | 2/2020 | Dou | H04J 11/004 |
| 2020/0374970 | A1 * | 11/2020 | Wang | H04W 52/0219 |
| 2021/0014931 | A1 * | 1/2021 | Noh | H04L 5/0035 |
| 2021/0028823 | A1 * | 1/2021 | Park | H04W 8/24 |
| 2021/0406677 | A1 * | 12/2021 | Wang | G06N 3/044 |
| 2022/0006493 | A1 * | 1/2022 | Wang | H04B 7/024 |
| 2022/0052742 | A1 * | 2/2022 | Huang | H04B 7/06956 |
| 2022/0294594 | A1 * | 9/2022 | Wang | H04L 5/0073 |
| 2022/0322319 | A1 * | 10/2022 | Liao | H04J 72/30 |
| 2022/0394725 | A1 * | 12/2022 | Wang | H04W 76/14 |
| 2023/0246760 | A1 * | 8/2023 | Khoshnevisan | H04B 7/026 |
| | | | | 370/329 |
| 2023/0276424 | A1 * | 8/2023 | Wang | H04W 72/121 |
| | | | | 370/329 |

* cited by examiner

100

115i

115j

115k

115h

105e

115g

115f

105f

115e

100

105d

105b

115d

115b

115c

105a

115a

105c

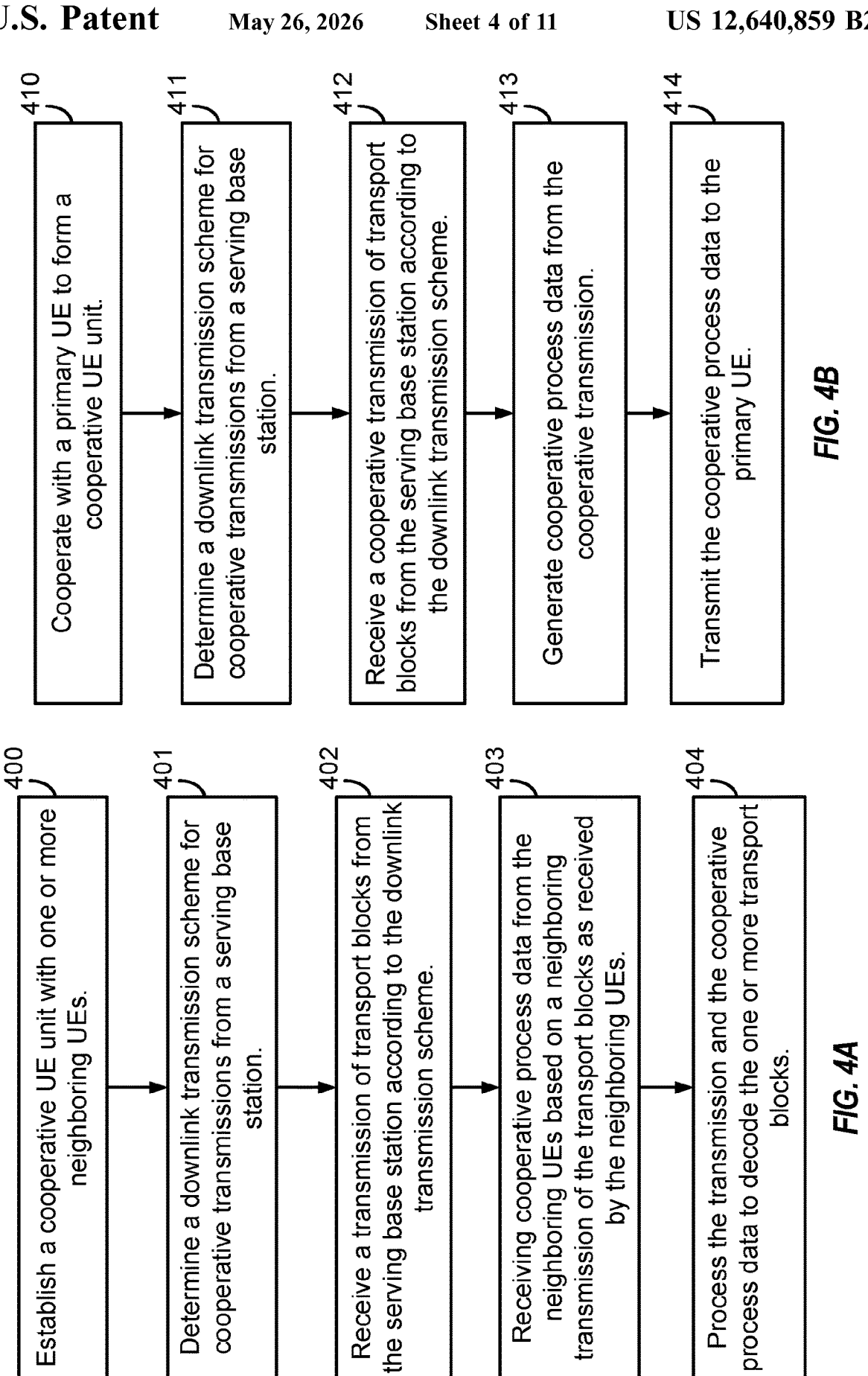

410 Cooperate with a primary UE to form a cooperative UE unit.

411 Determine a downlink transmission scheme for cooperative transmissions from a serving base station.

412 Receive a cooperative transmission of transport blocks from the serving base station according to the downlink transmission scheme.

413 Generate cooperative process data from the cooperative transmission.

414 Transmit the cooperative process data to the primary UE.

*FIG. 4B*

400 Establish a cooperative UE unit with one or more neighboring UEs.

401 Determine a downlink transmission scheme for cooperative transmissions from a serving base station.

402 Receive a transmission of transport blocks from the serving base station according to the downlink transmission scheme.

403 Receiving cooperative process data from the neighboring UEs based on a neighboring transmission of the transport blocks as received by the neighboring UEs.

404 Process the transmission and the cooperative process data to decode the one or more transport blocks.

*FIG. 4A*

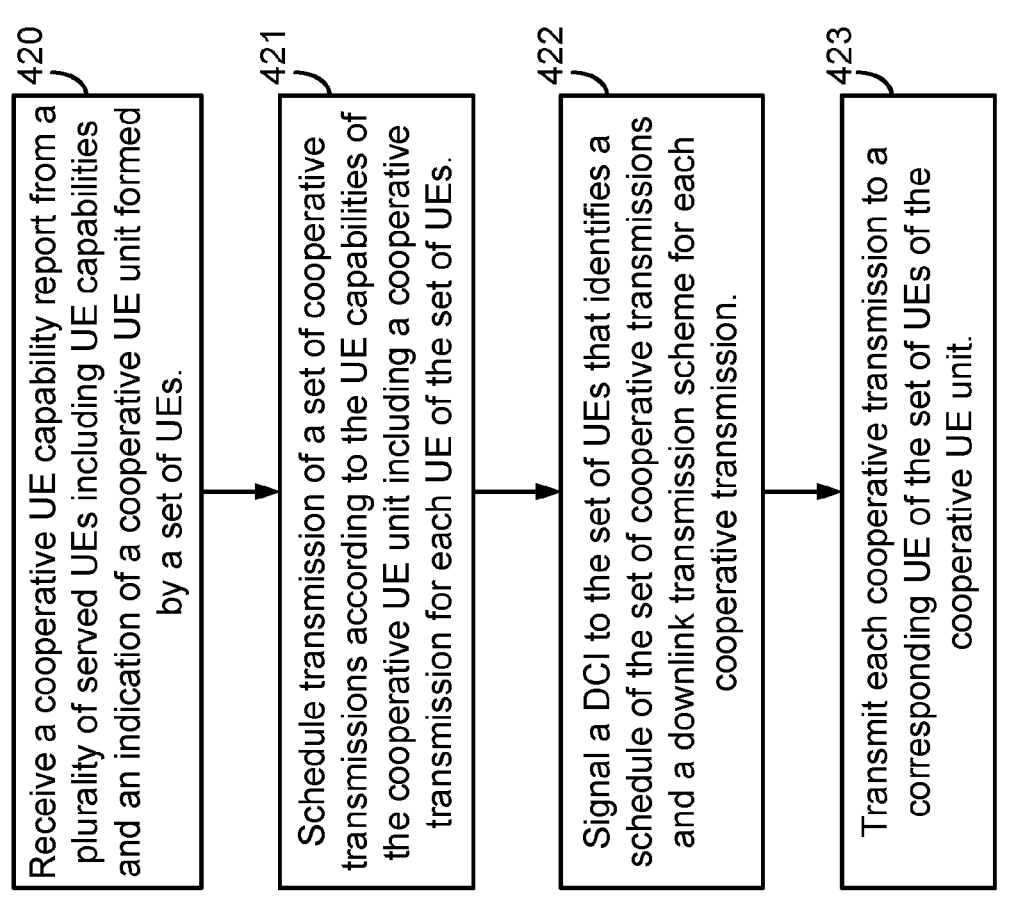

420 Receive a cooperative UE capability report from a plurality of served UEs including UE capabilities and an indication of a cooperative UE unit formed by a set of UEs.

421 Schedule transmission of a set of cooperative transmissions according to the UE capabilities of the cooperative UE unit including a cooperative transmission for each UE of the set of UEs.

422 Signal a DCI to the set of UEs that identifies a schedule of the set of cooperative transmissions and a downlink transmission scheme for each cooperative transmission.

423 Transmit each cooperative transmission to a corresponding UE of the set of UEs of the cooperative UE unit.

DOWNLINK SCHEMES FOR A COOPERATIVE USER EQUIPMENT WITH JOINT BASEBAND PROCESSING

CROSS-REFERENCE TO RELATED APPLICATIONS

This application claims the benefit of International Patent Application No. PCT/CN2020/110758, entitled, "DOWNLINK SCHEMES FOR A COOPERATIVE USER EQUIPMENT WITH JOINT BASEBAND PROCESSING," filed on Aug. 24, 2020, which is expressly incorporated by reference herein in its entirety.

TECHNICAL FIELD

Aspects of the present disclosure relate generally to wireless communication systems, and more particularly, to wireless communications with cooperative user equipment (UE) operations. Certain aspects of the technology discussed below can enable and provide downlink schemes for a cooperative UE with joint baseband (BB) processing.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes establishing, by a UE, a cooperative UE unit with one or more neighboring UEs, wherein the UE operates as the primary UE of the cooperative UE unit, determining, by the UE, a downlink transmission scheme for cooperative transmissions from a serving base station, receiving, by the UE, a transmission of one or more transport blocks from the serving base station according to the downlink transmission scheme, receiving, by the UE, cooperative process data from the one or more neighboring UEs, wherein the cooperative process data is based on a neighboring transmission of the one or more transport blocks by the serving base station as received by the one or more neighboring UEs, and processing, by the UE, the transmission and the cooperative process data to decode the one or more transport blocks.

In an additional aspect of the disclosure, a method of wireless communication includes cooperating, by a UE, with a primary UE to form a cooperative UE unit, determining, by the UE, a downlink transmission scheme for cooperative transmissions from a serving base station, receiving, by the UE, a cooperative transmission of one or more transport blocks from the serving base station according to the downlink transmission scheme, generating, by the UE, cooperative process data from the cooperative transmission, and transmitting, by the UE, the cooperative process data to the primary UE.

In an additional aspect of the disclosure, a method of wireless communication includes receiving, at a base station, a cooperative UE capability report from a plurality of served UEs, wherein the cooperative UE capability report includes UE capabilities and at least an indication of a cooperative UE unit formed by a set of UEs of the plurality of served UEs, scheduling, by the base station, transmission of a set of cooperative transmissions according to the UE capabilities of the cooperative UE unit, wherein the set of cooperative transmissions includes a cooperative transmission for each UE of the set of UEs, signaling, by the base station, a downlink control information (DCI) to the set of UEs, wherein the DCI identifies a schedule of the set of cooperative transmissions and a downlink transmission scheme for the transmission of each cooperative transmission of the set of cooperative transmissions, and transmitting, by the base station, each cooperative transmission of the set of cooperative transmissions according to the UE capabilities at the downlink transmission scheme to a corresponding UE of the set of UEs of the cooperative UE unit.

In an additional aspect of the disclosure, an apparatus configured for wireless communication includes means for establishing, by a UE, a cooperative UE unit with one or more neighboring UEs, wherein the UE operates as the primary UE of the cooperative UE unit, means for determining, by the UE, a downlink transmission scheme for cooperative transmissions from a serving base station, means for receiving, by the UE, a transmission of one or more transport blocks from the serving base station according to the downlink transmission scheme, means for receiving, by the UE, cooperative process data from the one or more neighboring UEs, wherein the cooperative process data is based on a neighboring transmission of the one or more transport blocks by the serving base station as received by the one or more neighboring UEs, and means for processing, by the UE, the transmission and the cooperative process data to decode the one or more transport blocks.

In an additional aspect of the disclosure, an apparatus configured for wireless communication includes means for cooperating, by a UE, with a primary UE to form a cooperative UE unit, means for determining, by the UE, a downlink transmission scheme for cooperative transmissions from a serving base station, means for receiving, by the UE, a cooperative transmission of one or more transport blocks from the serving base station according to the downlink transmission scheme, means for generating, by the UE, cooperative process data from the cooperative transmission, and means for transmitting, by the UE, the cooperative process data to the primary UE.

In an additional aspect of the disclosure, an apparatus configured for wireless communication includes means for receiving, at a base station, a cooperative UE capability report from a plurality of served UEs, wherein the cooperative UE capability report includes UE capabilities and at least an indication of a cooperative UE unit formed by a set of UEs of the plurality of served UEs, means for scheduling, by the base station, transmission of a set of cooperative transmissions according to the UE capabilities of the cooperative UE unit, wherein the set of cooperative transmissions includes a cooperative transmission for each UE of the set of UEs, means for signaling, by the base station, a DCI to the set of UEs, wherein the DCI identifies a schedule of the set of cooperative transmissions and a downlink transmission scheme for the transmission of each cooperative transmission of the set of cooperative transmissions, and means for transmitting, by the base station, each cooperative transmission of the set of cooperative transmissions according to the UE capabilities at the downlink transmission scheme to a corresponding UE of the set of UEs of the cooperative UE unit.

In an additional aspect of the disclosure, a non-transitory computer-readable medium having program code recorded thereon. The program code further includes code to establish, by a UE, a cooperative UE unit with one or more neighboring UEs, wherein the UE operates as the primary UE of the cooperative UE unit, code to determine, by the UE, a downlink transmission scheme for cooperative transmissions from a serving base station, code to receive, by the UE, a transmission of one or more transport blocks from the serving base station according to the downlink transmission scheme, code to receive, by the UE, cooperative process data from the one or more neighboring UEs, wherein the cooperative process data is based on a neighboring transmission of the one or more transport blocks by the serving base station as received by the one or more neighboring UEs, and code to process, by the UE, the transmission and the cooperative process data to decode the one or more transport blocks.

In an additional aspect of the disclosure, a non-transitory computer-readable medium having program code recorded thereon. The program code further includes code to cooperate, by a UE, with a primary UE to form a cooperative UE unit, code to determine, by the UE, a downlink transmission scheme for cooperative transmissions from a serving base station, code to receive, by the UE, a cooperative transmission of one or more transport blocks from the serving base station according to the downlink transmission scheme, code to generate, by the UE, cooperative process data from the cooperative transmission, and code to transmit, by the UE, the cooperative process data to the primary UE.

In an additional aspect of the disclosure, a non-transitory computer-readable medium having program code recorded thereon. The program code further includes code to receive, at a base station, a cooperative UE capability report from a plurality of served UEs, wherein the cooperative UE capability report includes UE capabilities and at least an indication of a cooperative UE unit formed by a set of UEs of the plurality of served UEs, code to schedule, by the base station, transmission of a set of cooperative transmissions according to the UE capabilities of the cooperative UE unit, wherein the set of cooperative transmissions includes a cooperative transmission for each UE of the set of UEs, code to signal, by the base station, a DCI to the set of UEs, wherein the DCI identifies a schedule of the set of cooperative transmissions and a downlink transmission scheme for the transmission of each cooperative transmission of the set of cooperative transmissions, and code to transmit, by the base station, each cooperative transmission of the set of cooperative transmissions according to the UE capabilities at the downlink transmission scheme to a corresponding UE of the set of UEs of the cooperative UE unit.

In an additional aspect of the disclosure, an apparatus configured for wireless communication is disclosed. The apparatus includes at least one processor, and a memory coupled to the processor. The processor is configured to establish, by a UE, a cooperative UE unit with one or more neighboring UEs, wherein the UE operates as the primary UE of the cooperative UE unit, to determine, by the UE, a downlink transmission scheme for cooperative transmissions from a serving base station, to receive, by the UE, a transmission of one or more transport blocks from the serving base station according to the downlink transmission scheme, to receive, by the UE, cooperative process data from the one or more neighboring UEs, wherein the cooperative process data is based on a neighboring transmission of the one or more transport blocks by the serving base station as received by the one or more neighboring UEs, and to process, by the UE, the transmission and the cooperative process data to decode the one or more transport blocks.

In an additional aspect of the disclosure, an apparatus configured for wireless communication is disclosed. The apparatus includes at least one processor, and a memory coupled to the processor. The processor is configured to cooperate, by a UE, with a primary UE to form a cooperative UE unit, to determine, by the UE, a downlink transmission scheme for cooperative transmissions from a serving base station, to receive, by the UE, a cooperative transmission of one or more transport blocks from the serving base station according to the downlink transmission scheme, to generate, by the UE, cooperative process data from the cooperative transmission, and to transmit, by the UE, the cooperative process data to the primary UE.

In an additional aspect of the disclosure, an apparatus configured for wireless communication is disclosed. The apparatus includes at least one processor, and a memory coupled to the processor. The processor is configured to receive, at a base station, a cooperative UE capability report from a plurality of served UEs, wherein the cooperative UE capability report includes UE capabilities and at least an indication of a cooperative UE unit formed by a set of UEs of the plurality of served UEs, to schedule, by the base station, transmission of a set of cooperative transmissions according to the UE capabilities of the cooperative UE unit, wherein the set of cooperative transmissions includes a cooperative transmission for each UE of the set of UEs, to signal, by the base station, a DCI to the set of UEs, wherein the DCI identifies a schedule of the set of cooperative transmissions and a downlink transmission scheme for the transmission of each cooperative transmission of the set of cooperative transmissions, and to transmit, by the base station, each cooperative transmission of the set of cooperative transmissions according to the UE capabilities at the downlink transmission scheme to a corresponding UE of the set of UEs of the cooperative UE unit.

Other aspects, features, and embodiments will become apparent to those of ordinary skill in the art, upon reviewing the following description of specific, exemplary embodiments in conjunction with the accompanying figures. While features may be discussed relative to certain aspects and figures below, all embodiments can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 4A-4C are block diagrams illustrating example blocks executed to implement aspects of the present disclosure.

Figure 1:
FIG. 1 is a block diagram illustrating details of a wireless communication system according to some embodiments of the present disclosure.

The Appendix provides further details regarding various embodiments of this disclosure and the subject matter therein forms a part of the specification of this application.

DETAILED DESCRIPTION

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
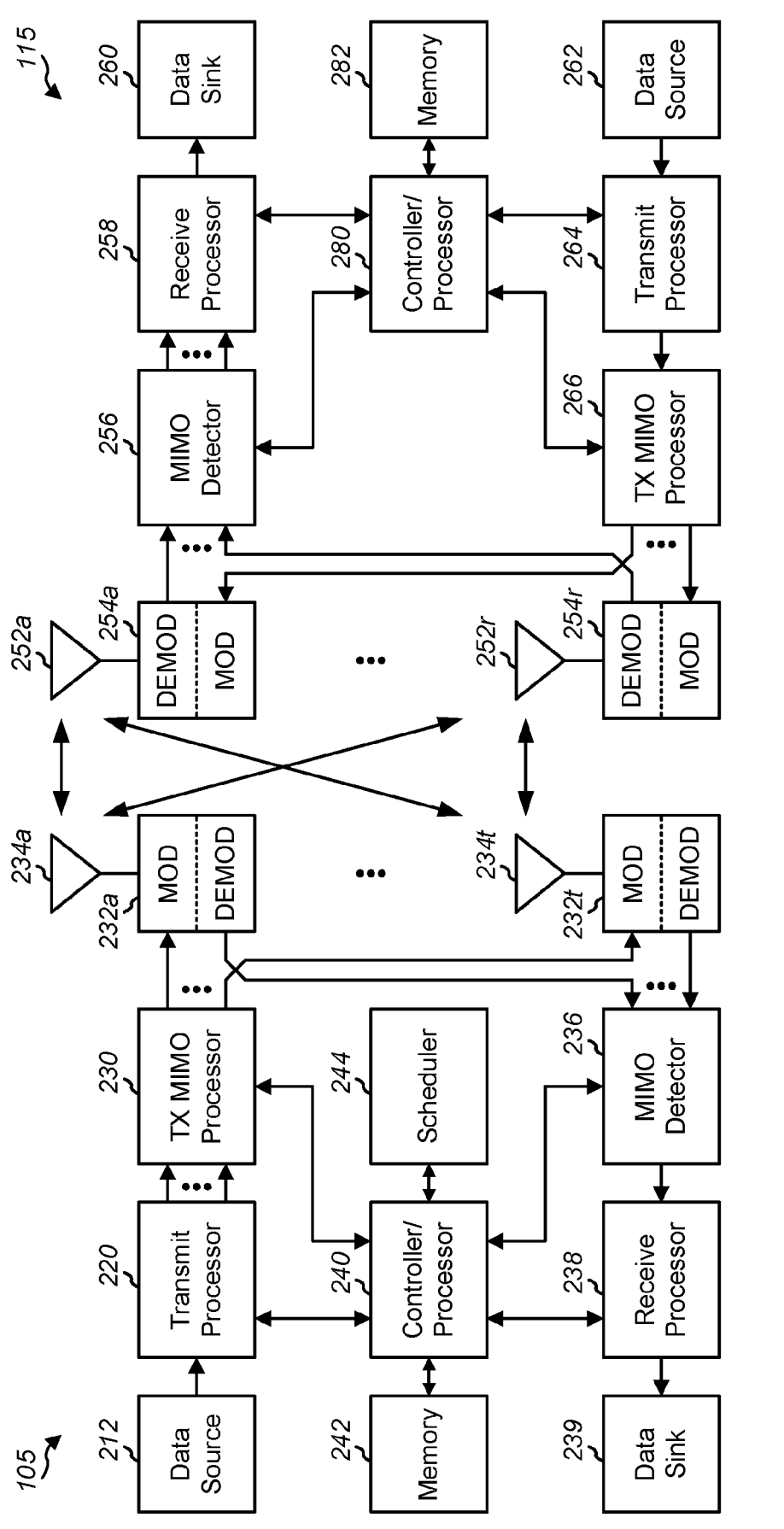
FIG. 2 is a block diagram conceptually illustrating a design of a base station and a UE configured according to some embodiments of the present disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 4A-4C, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/ negative-acknowledge (ACK/NACK) feedback for its own transmitted packets as a proxy for collisions.

Wireless communication operations using cooperative UEs has been suggested for increasing transmission efficiency. Multiple UEs participating in a cooperative UE operation provides a better aggregate radio frequency (RF) capability through the distributed antennas of the cooperative UE unit. For the UE form factor, baseband modem capabilities may be higher than its RF capabilities. The UE relays of the cooperative UE unit allow creation of a virtual UE with a larger number of antennas, which can then be exploited to increase user experience the over cellular network. Such distributed antennas may create a virtual multiple input, multiple output (MIMO) effect, where the virtual, cooperative UE uses a larger effective number of antennas. Such higher RF capability may be experienced widely over different communication frequencies, such as sub-7 GHz as well as in the millimeter wave (mmW) frequency bands.

Figure 3:
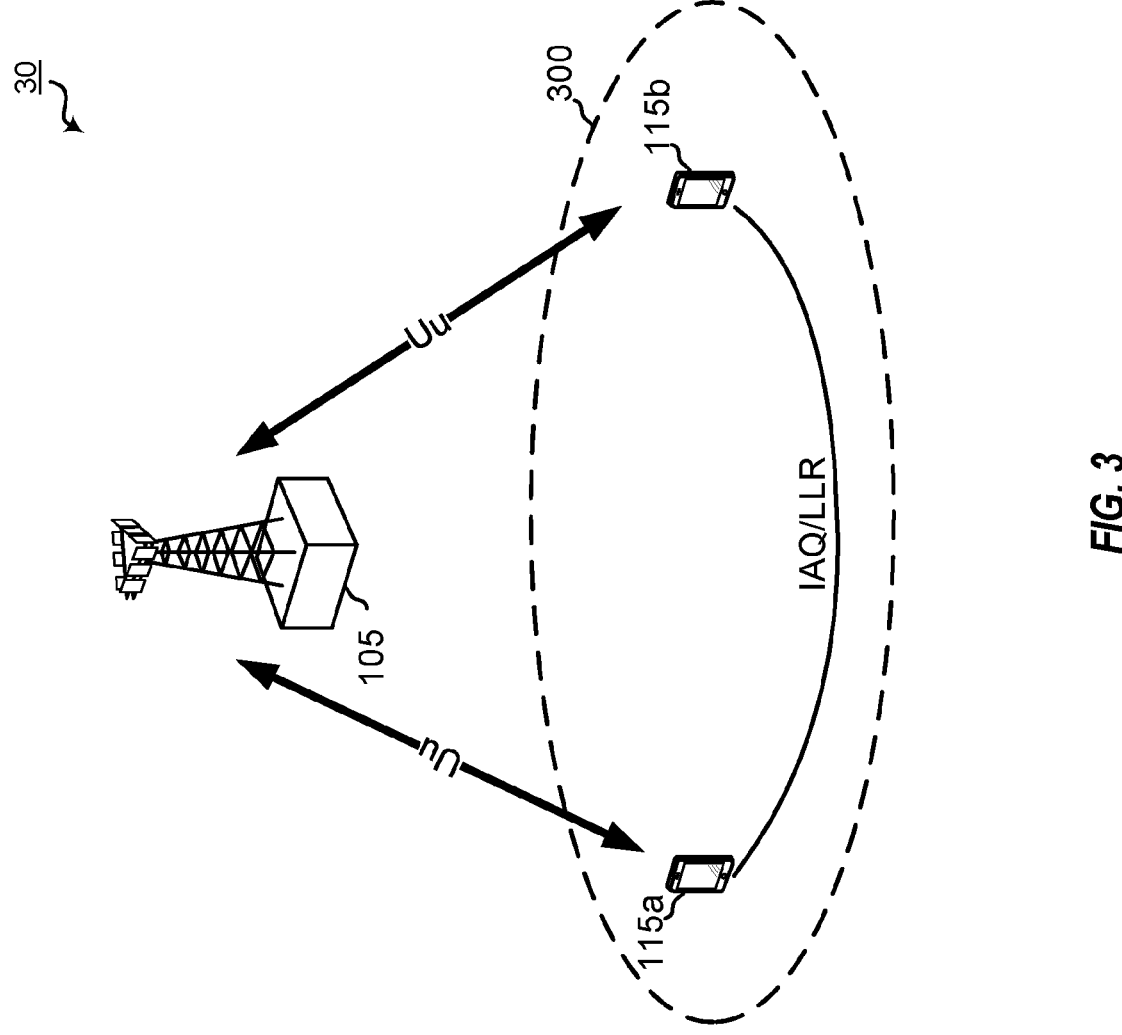
FIG. 3 is a block diagram illustrating a wireless network configured for communication between a base station and a cooperative UE unit made up of cooperating UEs.

FIG. 3 is a block diagram illustrating a wireless network 30 configured for communication between a base station 105 and a cooperative UE unit 300 made up of cooperating UEs, UEs 115a-115b. In order to form cooperative UE unit 300 with joint baseband processing across distributed antennas from different individual UEs, UEs 115a-115b, that belong to the cooperative UE unit 300, UEs within cooperative UE unit 300 may communicate information regarding received signaling to the primary UE, UE 115a, of the unit. Such information may be referred to herein as cooperative process data. In one example, cooperative process data may be configured for an in-phase and quadrature (IAQ) exchange where a secondary UE, UE 115b, of cooperative UE unit 300 transmits the received signals, before or after applying a transform (e.g., fast Fourier transform (FFT)), but before demodulation or de-mapping, to primary UE 115a. Primary UE 115a may then perform joint demodulation or demapping and decoding. Alternatively, cooperative process data may be configured as a log-likelihood ratio (LLR) exchange where secondary UE 115b transmits LLR values after demodulation or demapping of the received signals to primary UE 115a. Primary UE 115a may then perform joint decoding using the LLR values from secondary UE 115b.

It should be noted that the communication of the cooperative process data between the UEs of a cooperative UE unit may occur using various technologies, such as via a sidelink transmission, shorter-range wireless technology (e.g., WiFi, Bluetooth®, etc.). The various aspects of the present disclosure may be applicable to cooperative UE operations which use any variety of UE-to-UE communication methods.

The IAQ and LLR options for cooperative process data may use different levels of overhead for cooperative UE operations. Such overhead is provided below in Table 1.

TABLE 1

| | Use Case | Overhead |
|---|---|---|
| IAQ | Distributed MIMO: UE 115a may have limited RF capabilities but enhanced baseband processing capability. | $N_{RE}*N_{Rx}*2*N_{quant}$ |
| LLR (for downlink) | Distributed Computing: UE 115a may have limited RF and baseband processing capabilities. UE 115b sends LLRs to UE 115a after channel estimation and demodulation. | $N_{REdata}*N_{Layer}*N_{Mod}*N_{quant}$ |

According to Table 1, an IAQ exchange configuration for cooperative process data may implement a distributed MIMO functionality where the primary UE, UE 115a, may have limited RF capabilities, in which the secondary UE, UE 115b, provides distributed antennas for receiving the cooperative transmission and communicates to the primary UE, UE 115a, the IAQ information of the pre-demodulated received cooperative transmission. In such use case, UE 115a may have enhanced baseband processing capabilities, thus, UE 115a uses the cooperative transmission transmitted directly to UE 115a from base station 105 and the IAQ information of the pre-demodulated received cooperative transmission to jointly demodulate what results in a higher-order MIMO transmission.

The overhead for the IAQ exchange configuration includes the number of resource elements of the transmission, including DMRS, $N_{RE}$, the number of receive antennas at the receiving UE, $N_{Rx}$, multiplied by 2 because of the in-phase (I) and quadrature (Q) components of the IAQ information, and the quantization factor for quantizing the I and Q components, $N_{quant}$:

The LLR exchange configuration for cooperative process data, according to Table 1, may implement a distributed computing functionality where the primary UE, UE 115a, may have both limited RF capabilities and limited baseband processing capabilities. In such distributed computing functionality, the secondary UE, UE 115b, provides both the distributed antennas and additional processing capabilities to both receive the cooperative transmission transmitted to UE 115b and demodulating the received cooperative transmission. UE 115b may then calculate the LLR values on the coded symbols of the demodulated received cooperative transmission. UE 115b sends these LLR values to UE 115a. The primary UE, UE 115a, demodulates the received cooperative transmission directly transmitted to UE 115a by base station 105, calculates its own LLR values on the codded symbols after demodulation and then jointly decodes the coded symbols using its own LLR values and the LLR values from the secondary UE, UE 115b.

The overhead for the LLR exchange configuration includes the number of resource elements of the data transmission, $N_{RE\_data}$, the number of layers available for processing at UE 115a, $N_{Layer}$, the modulation order, $N_{Mod}$, and the LLR quantization value, $N_{quant}$, which, for the LLR exchange, can be smaller than $N_{quant}$ for IAQ exchange because of the sensitivity of the LLR values is typically less than for IAQ.

An analogous operation for consideration may be the multiple transmission-reception point (mTRP) scheme described in 3GPP Release 16 (Rel. 16). Consider the single-DCI based mTRP design, where a single NR-PDCCH schedules a single NR-PDSCH. Various schemes have been suggested and specified, such as when different TRPs transmit different sets of spatial layers in overlapping resource blocks (RBs)/symbols (spatial division multiplex (SDM)/non-coherent joint transmission (NCJT)), or different TRPs transmit in different sets of RBs (frequency division multiplex (FDM)), or different TRPs transmit in different sets of OFDM symbols (time division multiplex (TDM)).

In the SDM operation of mTRP, different layers may be transmitted with different transmission configuration indicator (TCI) states (from different TRPs). Demodulation reference signal (DMRS) ports corresponding to different TCI states may be in different code division multiple (CDM) groups. In this example, 2 layers (DMRS ports 0, 1 in the first CDM group) may be transmitted with a first TCI state; and 2 layers (DMRS ports 2, 3 in the second CDM group) may be transmitted with second TCI state.

In the FDM operation of mTRP, a different set of RBs may be transmitted with different TCI states, while in the TDM operations, a different set of OFDM symbols (e.g. different mini-slots/slots) are transmitted with different TCI states.

In focusing on downlink transmissions (e.g., PDSCH, PDCCH, etc.), different schemes have been suggested for cooperative UE operations, such as single user (SU)-MIMO, SDM, FDM, and TDM, as well as extending transmissions to more than two beams, TCI states, or any combination of such schemes.

In the case of mTRP, the multiple beams are due to the multiple TRPs/beams at the transmitter side. In contrast, the multiple beams in cooperative UE operations are due to the multiple UEs that form the cooperative UE unit with distributed receive antennas or distributed antenna panels across the cooperating UEs. In addition, the type of cooperative process data may affect rank. For example, configuration for use of LLR information exchange can introduce rank limitations compared to IAQ information exchange. When the cooperative process data is configured for IAQ exchange, operations of the cooperative UE unit become similar to a regular UE in terms of the operational downlink transmission schemes (e.g., Rel. 16 downlink transmission schemes can be directly used for cooperative UE operation).

Figure 7:
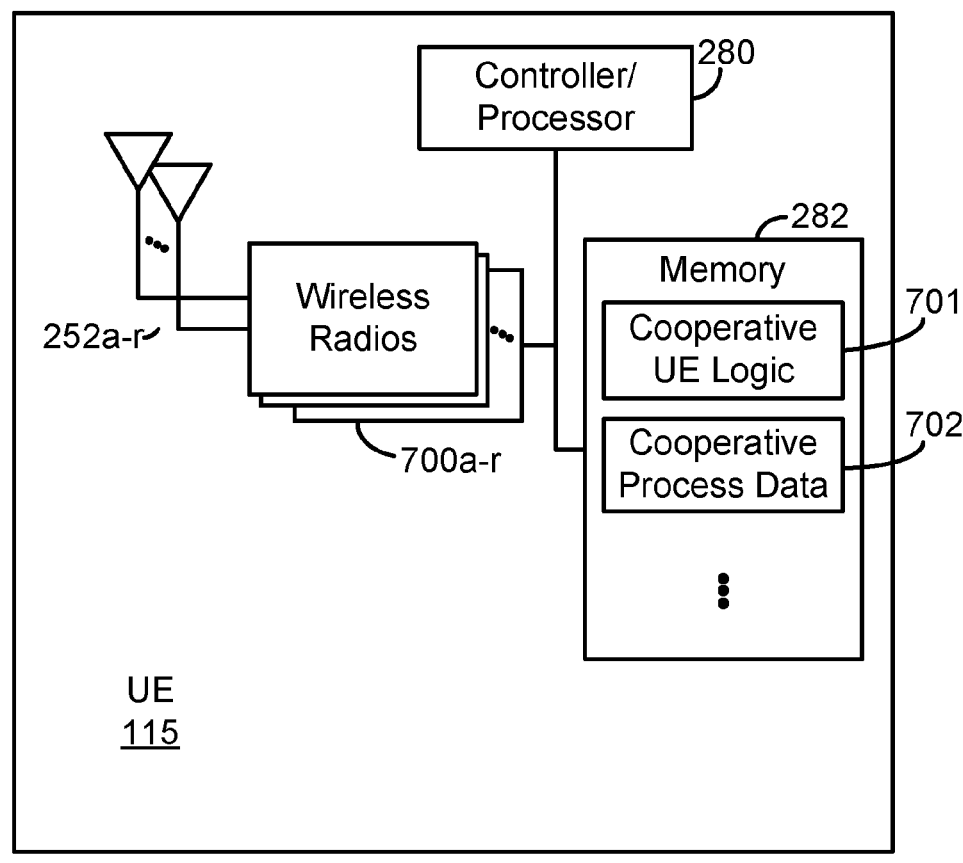
FIG. 7 is a block diagram illustrating an example configuration of a UE configured according to one aspect of the present disclosure.

FIG. 4A is a block diagram illustrating example blocks executed by a primary UE to implement one aspect of the present disclosure. The example blocks will also be described with respect to UE 115 as illustrated in FIGS. 2 and 7. FIG. 7 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 700a-r and antennas 252a-r. Wireless radios 700a-r includes various components and hardware, as illustrated in FIG. 2 for UE 115, including modulator/demodulators 254a-r, MIMO detector 256, receive processor 258, transmit processor 264, and TX MIMO processor 266.

At block 400, a UE establishes a cooperative UE unit with one or more neighboring UEs, wherein the UE operates as the primary UE of the cooperative UE unit. A UE, such as UE 115, executes, under control of controller/processor 280, cooperative UE logic 701, stored in memory 282. The functionality and processes enabled through execution of the instructions of cooperative UE logic 701 (referred to herein as the "execution environment" of cooperative UE logic 701) provides UE 115 with the functionality to cooperative with neighboring UEs to create a cooperative UE unit. Within the execution environment of cooperative UE logic 701, UE 115 may communicated with other neighboring UEs to form a cooperative UE unit. In establishing the cooperative UE unit, the participating UEs may exchange capabilities data that identifies the various modes and associated processing capabilities of each UE. Each UE may then determine the combined capability of the cooperative UE unit. As illustrated in FIG. 4A, UE 115 operates as a primary UE within the cooperative UE unit.

At block 401, the UE determines a downlink transmission scheme for cooperative transmissions from a serving base station. UE 115 may receive a DCI from a serving base station via antennas 252a-r and wireless radios 700a-r which includes scheduling of the cooperative downlink transmission to the cooperative UE along with the downlink transmission scheme of that scheduled transmission. UE 115 may then identify this transmission scheme for use within the execution environment of cooperative UE logic 701 for cooperative UE operations.

At block 402, the UE receives a transmission of one or more transport blocks from the serving base station according to the downlink transmission scheme. UE 115 may receive the cooperative downlink transmission of one or more transport blocks via antennas 252a-r and wireless radios 700a-r from the serving base station directly transmitted to UE 115.

At block 403, the UE receives cooperative process data from the one or more neighboring UEs, wherein the cooperative process data is based on a neighboring transmission of the one or more transport blocks by the serving base station as received by the one or more neighboring UEs. Within the execution environment of cooperative UE logic 701, secondary UEs of the cooperative UE unit generate cooperative process data, such as using IAQ information exchange from the received cooperative transmission to the secondary UE for the pre-demodulated transmission or LLR values exchange from LLR values calculated from the coded symbols of the demodulated transmission at the secondary UE. The secondary UEs then send this cooperative process data to the primary UE.

At block 404, the UE processes the transmission and the cooperative process data to decode the one or more transport blocks. Before processing the received direct cooperative transmission, UE 115 waits to receive the cooperative process data from the secondary UEs. UE 115 may then, within the execution environment of cooperative UE logic 701, jointly process the cooperative transmission, such as through joint demodulating using IAQ information exchanged from the secondary UE, or through joint decoding, after UE 115 demodulates the cooperative transmission, where UE 115 uses both the LLR values exchanged from the secondary UE and the LLRs calculated at UE 115 from demodulation of the received cooperative transmission.

FIG. 4B is a block diagram illustrating example block executed by a secondary UE to implement one aspect of the present disclosure. The example blocks will also be described with respect to UE 115 as illustrated in FIGS. 2 and 7.

At block 410, a UE cooperates with a primary UE to form a cooperative UE unit. A UE, such as UE 115, executes, under control of controller/processor 280, cooperative UE logic 701, stored in memory 282. Within the execution environment of cooperative UE logic 701, UE 115 may communicated with other neighboring UEs to form a cooperative UE unit. In establishing the cooperative UE unit, the participating UEs may exchange capabilities data that identifies the various modes and associated processing capabilities of each UE. Each UE may then determine the combined capability of the cooperative UE unit. As illustrated in FIG. 4B, UE 115 operates as a secondary UE within the cooperative UE unit.

At block 411, the UE determines a downlink transmission scheme for cooperative transmissions from a serving base station. UE 115 may receive a DCI from a serving base station via antennas 252*a-r* and wireless radios 700*a-r* which includes scheduling of the cooperative downlink transmission to the cooperative UE along with the downlink transmission scheme of that scheduled transmission. UE 115 may then identify this transmission scheme for use within the execution environment of cooperative UE logic 701 for cooperative UE operations.

At block 412, the UE receives a cooperative transmission of one or more transport blocks from the serving base station according to the downlink transmission scheme. UE 115 may receive the cooperative downlink transmission of one or more transport blocks via antennas 252*a-r* and wireless radios 700*a-r* from the serving base station directly transmitted to UE 115, as the secondary UE.

At block 413, the UE generates cooperative process data from the cooperative transmission. As noted above, within the execution environment of cooperative UE logic 701, secondary UEs of the cooperative UE unit, such as UE 115, generate cooperative process data, such as using IAQ information exchange from the received cooperative transmission to the secondary UE for the pre-demodulated transmission or LLR values exchange from LLR values calculated from the coded symbols of the demodulated transmission at the secondary UE.

At block 414, the UE transmits the cooperative process data to the primary UE. Once UE 115 generates the cooperative process data, it may then send this cooperative process data to the primary UE via wireless radios 700*a-r* and antennas 252*a-r*.

Figure 8:
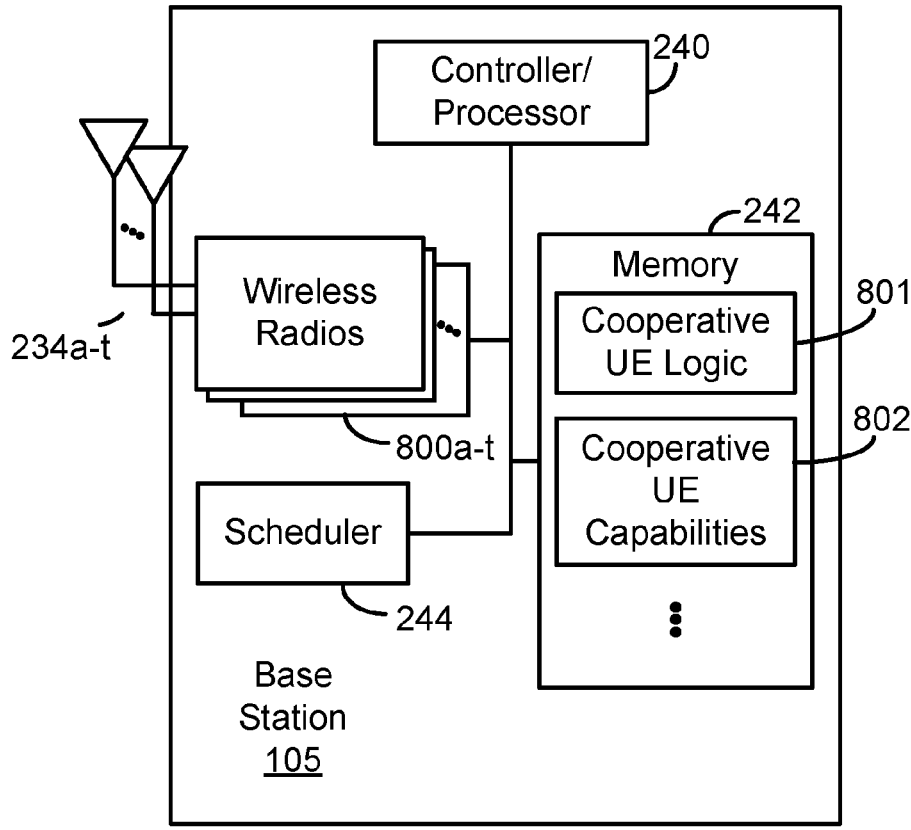
FIG. 8 is a block diagram illustrating an example configuration of a base station configured according to one aspect of the present disclosure.

FIG. 4C is a block diagram illustrating example blocks executed by a base station to implement one aspect of the present disclosure. The example blocks will also be described with respect to base station 105 as illustrated in FIGS. 2 and 8. FIG. 8 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 800*a-t* and antennas 234*a-t*. Wireless radios 800*a-t* includes various components and hardware, as illustrated in FIG. 2 for base station 105, including modulator/demodulators 232*a-t*, MIMO detector 236, receive processor 238, transmit processor 220, and TX MIMO processor 230.

At block 420, a base station receives a cooperative UE capability report from a plurality of served UEs, wherein the cooperative UE capability report includes UE capabilities and at least an indication of a cooperative UE unit formed by a set of UEs of the plurality of served UEs. A base station, such as base station 105, executes, under control of controller/processor 240, cooperative UE logic 801, stored in memory 242. The execution of cooperative UE logic 801 provides base station 105 with the functionality to manage several UEs as a cooperative UE unit. Within the execution environment of cooperative UE logic 801, base station 105 receives a cooperative capability report from one or more UEs of a cooperative UE unit and stores such capabilities in memory 242 at cooperative UE capabilities 802.

At block 421, the base station schedules transmission of a set of cooperative transmissions according to the UE capabilities of the cooperative UE unit, wherein the set of cooperative transmissions includes a cooperative transmission for each UE of the set of UEs. Within the execution environment of cooperative UE logic 801, base station 105 uses the capabilities information to schedule the set of downlink cooperative transmission, via scheduler 244, for each UE of the cooperative UE unit.

At block 422, the base station signals a DCI to the set of UEs, wherein the DCI identifies a schedule of the set of cooperative transmissions and a downlink transmission scheme for the transmission of each cooperative transmission of the set of cooperative transmissions. Base station 105, after scheduler 244 schedules the downlink cooperative transmissions, generates a DCI message and transmits the DCI with the scheduling information to the cooperative UE via wireless radios 800*a-t* and antennas 234*a-t*.

At block 423, the base station transmits each cooperative transmission of the set of cooperative transmissions according to the UE capabilities at the downlink transmission scheme to a corresponding UE of the set of UEs of the cooperative UE unit. Base station 105 compile data for transmission to the cooperative UE unit and, within the execution environment of cooperative UE logic 801, transmits each cooperative transmission to the corresponding UE of the cooperative UE unit via wireless radios 800*a-t* and antennas 234*a-t*.

Figure 5A:
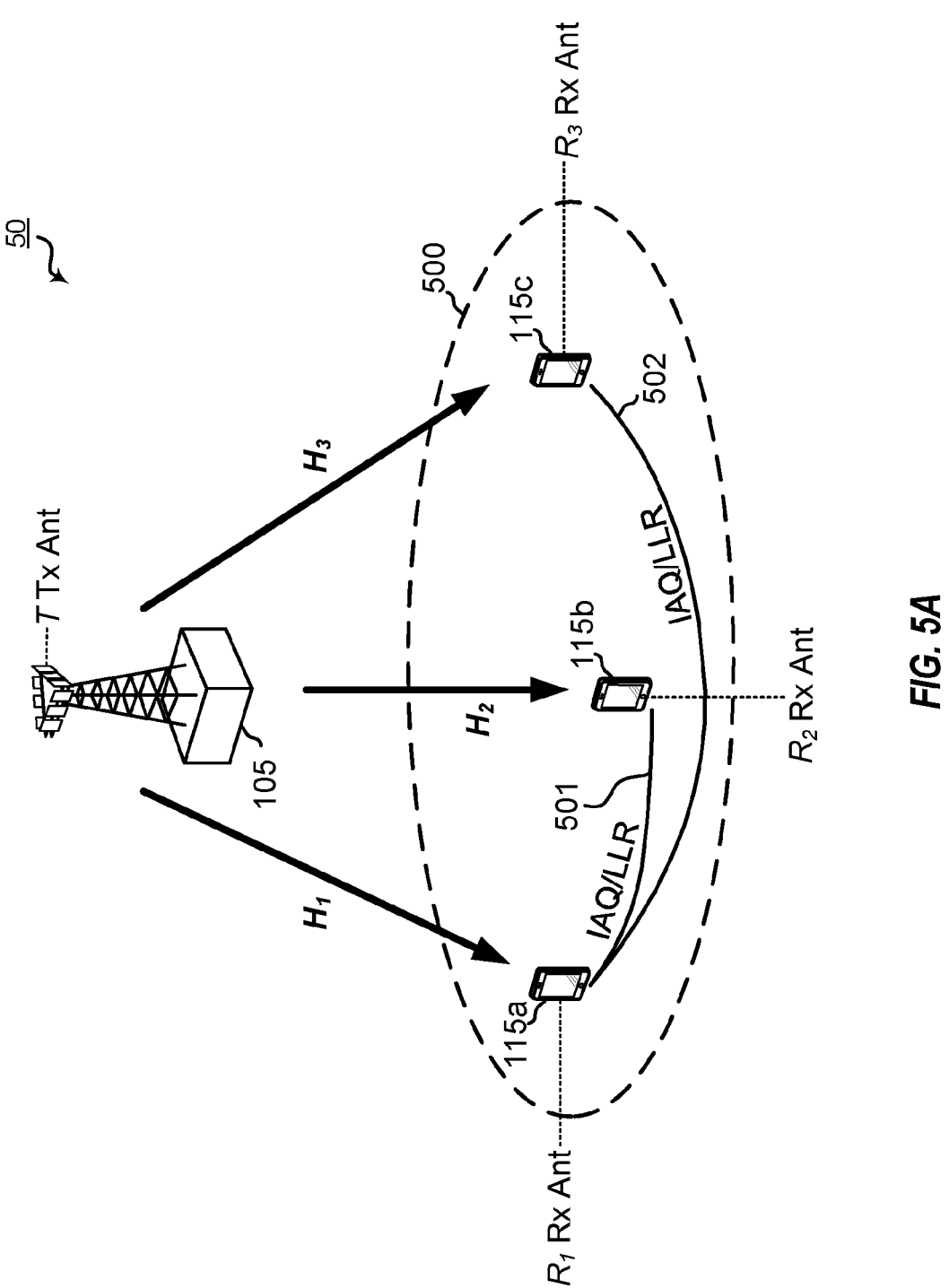
FIG. 5A is a block diagram illustrating a wireless network having a base station and UEs participating together in cooperative UE operations according to one aspect of the present disclosure under an SU-MIMO downlink transmission scheme.

FIG. 5A is a block diagram illustrating wireless network 50 having base station 105 and UEs 115*a*-115*c* participating together in cooperative UE operations according to one aspect of the present disclosure under an SU-M IMO downlink transmission scheme. When configured using SU-MIMO functionality, the same payload (e.g., transport block (TB), codeword, or modulated symbol (X)) may be transmitted by base station 105 to each participating UE, UEs 115*a*-115*c*, in cooperative UE unit 500 using the same beam/precoding (W). The communications over the SU-MIMO scheme transmits each layer to each participating UE, UEs 115*a*-115*c*, where X represents one codeword (CW) and the optimal beam (W) is a joint singular value decomposition (SVD). For the cooperative process data, the IAQ exchange option may be represented by the following concatenated matrix equation:

$$\begin{pmatrix} Y_1 \\ Y_2 \\ Y_3 \end{pmatrix}_{(R_1+R_2+R_3)\times 1} = \begin{pmatrix} H_1 \\ H_2 \\ H_3 \end{pmatrix}_{(R_1+R_2+R_3)\times T} W_{T\times L} X_{L\times 1} \tag{1}$$

Where, $Y_1$, $Y_2$, and $Y_3$ represent the received signals over the maximum number of layers supported by UEs 115*a*-115*c* for processing, $R_1$, $R_2$, and $R_3$, $H_1$, $H_2$, and $H_3$ represent the channel coefficients for the channels from transmit antennas T to receive layers, $R_1$, $R_2$, and $R_3$, $W_{T\times L}$ represents the precoding/beamforming coefficient of the transmit antennas T over a minimum rank or number of layers for transmission, L, and $X_{L\times 1}$ represents the transmitted data over the rank or number layers, L.

When the cooperative process data is configured as the LLR exchange option, received data may be represented by the following equations:

$$Y_{1_{R_1\times 1}} = H_{1_{R_1,T}} W_{T\times L} X_{L\times 1} \tag{2}$$

$$Y_{2_{R_2\times 1}} = H_{2_{R_2,T}} W_{T\times L} X_{L\times 1} \tag{3}$$

$$Y_{3_{R_3\times 1}} = H_{3_{R_3,T}} W_{T\times L} X_{L\times 1} \tag{4}$$

The LLRs are calculated by UEs 115*a*-115*c* based on the demodulation of these received data signals at each of UEs 115*a*-115*c*. When configured for the LLR exchange, the rank or number of layers, L, for base station 105 to use with the cooperative transmission may be no greater than a minimum between the maximum number of layers supported by UEs 115*a*-115*c* for processing (L≤min(R₁, R₂, R₃)). Thus, the borrowing of receive antennas from other UEs participating in cooperative UE unit 500 would not result in increasing the rank available for transmissions from base station 105.

Figure 5B:
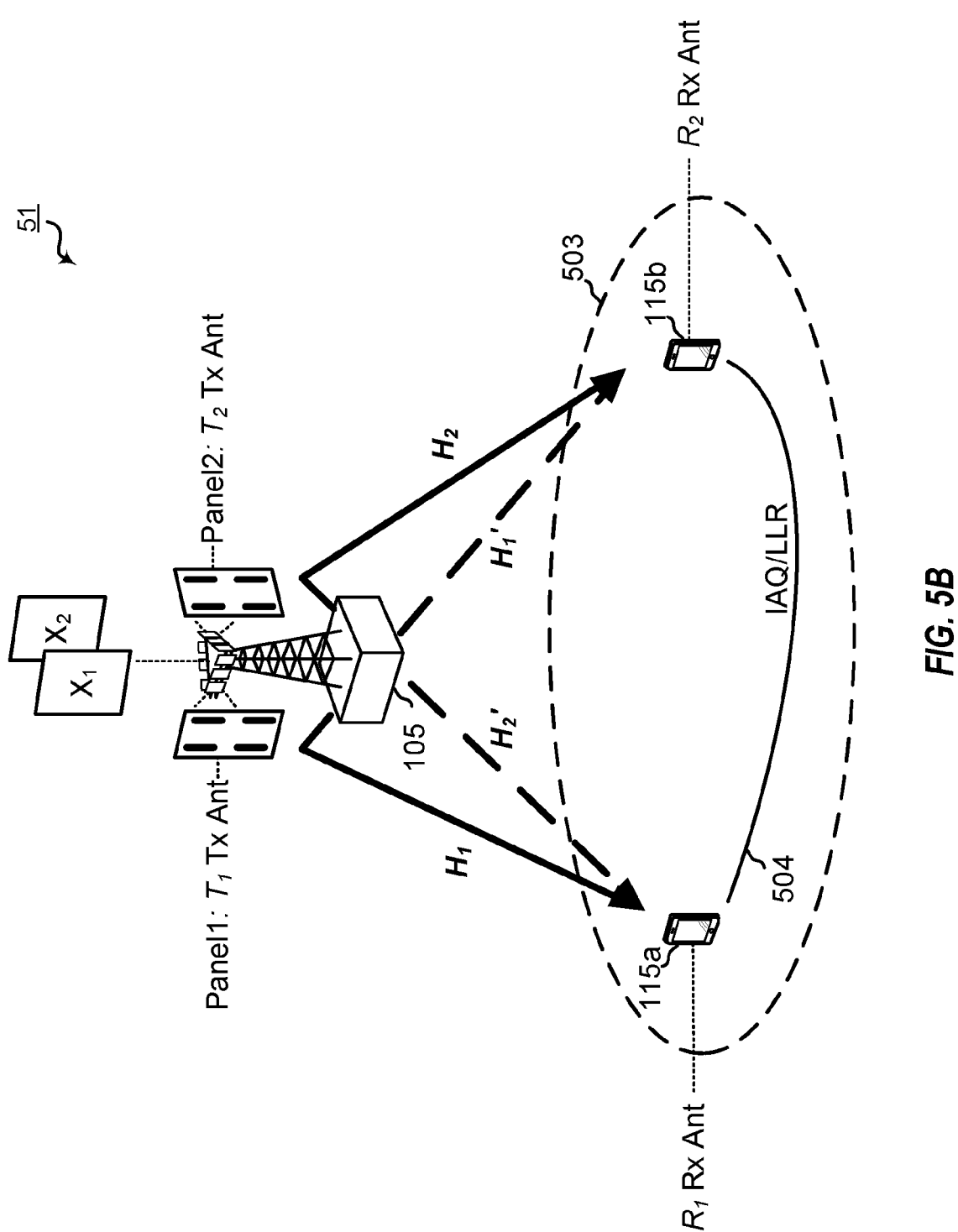
FIG. 5B is a block diagram illustrating a wireless network having a base station and UEs participating together in cooperative UE operations according to one aspect of the present disclosure under either an SDM or NCJT downlink transmission scheme.

FIG. 5B is a block diagram illustrating wireless network 51 having base station 105 and UEs 115*a*-115*b* participating together in cooperative UE operations according to one aspect of the present disclosure under either an SDM or NCJT downlink transmission scheme. When cooperative UE operations according to the present disclosure operate using either an SDM or NCJT, with multi-TCI state or multi-beam transmissions, different precodings or beams (W₁, W₂) may be transmitted by base station 105 on a different set of layers, where the modulated symbols for each of the different beams/layers may also be different (X₁, X₂).

Base station 105 transmits the different layers to different UEs, UE 115*a* and 115*b*. The different modulated symbols, X₁ and X₂, can correspond to the same transport block (TB), either using a single redundancy version (RV) with joint rate-matching or multiple RVs with separate rate-matching or repetitions. Alternatively, the different modulated symbols, X₁ and X₂, can correspond to different TBs.

Under the SDM or NCJT transmission schemes, when the cooperative process data exchange for cooperative UE operations is configured for the IAG exchange option, the IAQ exchange may be represented by the following concatenated matrix equation:

$$\begin{pmatrix} Y_1 \\ Y_2 \end{pmatrix}_{(R_1+R_2)\times 1} = \begin{pmatrix} H_1 & H_2' \\ H_1' & H_2 \end{pmatrix}_{(R_1+R_2)\times (T_1+T_2)} \begin{pmatrix} W_{1_{T_1\times L_1}} & X_{1_{L_1\times 1}} \\ W_{2_{T_2\times L_2}} & X_{2_{L_2\times 1}} \end{pmatrix} \tag{5}$$

Where $H'_1$ and $H'_2$ represent the channel coefficients of the channel at UE 115*a* and 115*b*, respectively, receiving the transmission targeted for the other UE of cooperative UE unit 500, and T1 and T2 represent the number of transmit antennas of antenna panel 1 and panel 2, respectively, of base station 105. For example, $H'_1$ is the channel coefficient at UE 115*a* for receiving the transmission, X₂, directly transmitted to UE 115*b*. Conversely, $H'_2$ is the channel coefficient at UE 115*b* for receiving the transmission, X₁, directly transmitted to UE 115*a*.

When the cooperative process data is configured as the LLR exchange option, the LLR may be configured as either one of two types. A type 1 LLR represents the LLR calculated on coded symbols after demodulating signals that were directly transmitted from base station 105 to the LLR-calculating UE. Such calculation of LLR values do not demodulate or process any component of received data and, instead, treats the other cooperative transmissions transmitted directly from base station 105 to any of the other UEs of cooperative UE unit 500 as interference. A type 2 LLR represents the LLR calculated on coded symbols after demodulating all received signals that account both for components of direct cooperative transmissions received at a participating UE (the direct transmission component) and for indirect cooperative transmissions transmitted to the other UE of cooperative UE unit 500 that are received at the other participating UE (the indirect transmission component). The received data at each of UEs 115*a* and 115*b* used for calculating the LLR exchange may be represented by the following equations:

$$Y_{1_{R_1\times 1}} = \left[ H_{1_{R_1,T_1}} W_{1_{T_1\times L_1}} X_{1_{L_1\times 1}} \right]^{Type\,1} + \left[ H'_{2_{R_1,T_2}} W_{2_{T_2\times L_2}} X_{2_{L_2\times 1}} \right]^{Type\,2} \tag{6}$$

$$Y_{2_{R_2\times 1}} = \left[ H_{2_{R_2,T_2}} W_{2_{T_2\times L_2}} X_{2_{L_2\times 1}} \right]^{Type\,1} + \left[ H'_{1_{R_2,T_1}} W_{1_{T_1\times L_1}} X_{1_{L_1\times 1}} \right]^{Type\,2} \tag{7}$$

Where the first "Type 1" portion of equations (6) and (7) represent the received data when the cooperative process data is configured to the Type 1 LLR exchange option, and the second "Type 2" portion of equations (6) and (7) represent the received data when the cooperative process data is configured to the Type 2 LLR exchange option. For example, when the UEs of a cooperative UE operation are configured for Type 1 LLR exchange, equations (6) and (7) would include only the Type 1 portion as the UE would not be processing signals directly transmitted to the other cooperative UEs, while when the UEs are configured for Type 2 LLR exchange, equations (6) and (7) would include both the Type 1 and Type 2 portions, as the UE also processes what it receives of the cooperative transmissions transmitted directly to the other cooperative UEs.

When configured for the Type 1 LLR exchange option, the rank or number of layers, $L_1$ and $L_2$, for base station 105 to use with the cooperative transmission may be not greater than the maximum number of layers supported by UEs 115a and 115b for processing ($L_1 \leq R_1$ and $L_2 \leq R_2$). In contrast, when configured for the Type 2 LLR exchange option, the sum of the rank or number of layers, $L_1$ and $L_2$, for base station 105 to use with the cooperative transmission may be not greater than a minimum of the maximum number of layers supported between UEs 115a and 115b for processing ($L_1 + L_2 \leq \min(R_1, R_2)$). Thus, while the borrowing of receive antennas under the Type 2 LLC exchange option does not increase the rank for cooperative transmissions from base station 105, the borrowing of receive antennas under the Type 1 LLC exchange options may increase the rank, as different layers can be separately demodulated.

Figure 5C:
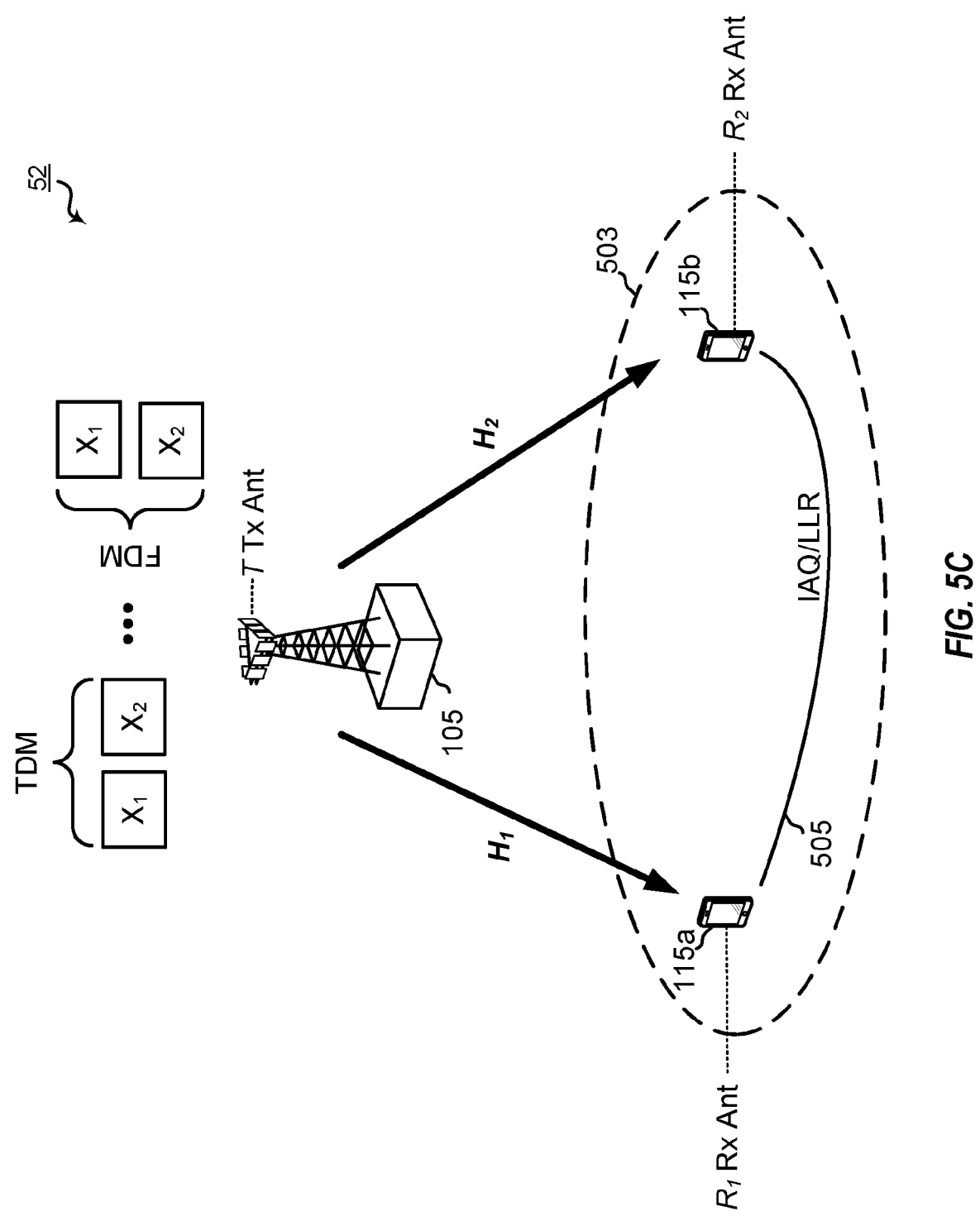
FIG. 5C is a block diagram illustrating a wireless network having a base station and UEs participating together in cooperative UE operations according to one aspect of the present disclosure under either an TDM or FDM downlink transmission scheme.

FIG. 5C is a block diagram illustrating wireless network 52 having base station 105 and UEs 115a-115b participating together in cooperative UE operations according to one aspect of the present disclosure under either an TDM or FDM downlink transmission scheme. When cooperative UE operations according to the present disclosure operate using either a TDM or FDM, with multiple TCI state or multiple beam transmissions, different precodings or beams ($W_1, W_2$) may be used on different RBs (FDM) or symbols (TDM), where the modulated symbols for each of the different beams/layers may also be different ($X_1, X_2$). Base station 105 transmits the different beams/layer to the different UEs of cooperative UE unit 503, UE 115a and 115b. The different modulated symbols, $X_1$ and $X_2$, may correspond to the same transport block (TB), either using a single redundancy version (RV) with joint rate-matching, or multiple RVs with separate rate-matching or repetitions.

When the cooperative process data exchange is configured for the IAQ exchange option, the IAQ exchange may be represented by the following concatenated matrix equations:

$$\begin{pmatrix} Y_{1,1} \\ Y_{2,1} \end{pmatrix}_{(R_1+R_2)\times 1} = \begin{pmatrix} H_1 \\ H_2 \end{pmatrix}_{(R_1+R_2)\times T} W_{1_{T\times L_1}} X_{1_{L_1 \times 1}} \qquad (8)$$

$$\begin{pmatrix} Y_{1,2} \\ Y_{2,2} \end{pmatrix}_{(R_1+R_2)\times 1} = \begin{pmatrix} H_1 \\ H_2 \end{pmatrix}_{(R_1+R_2)\times T} W_{2_{T\times L_2}} X_{2_{L_2 \times 1}} \qquad (9)$$

Equation (8) represents the IAQ received data for $X_1$ at UE 115a ($Y_{1,1}$) and 115b ($Y_{2,1}$) and equation (9) represents the IAQ received data for $X_2$ at UE 115a ($Y_{1,2}$) and 115b ($Y_{2,2}$).

The received data at each of UEs 115a and 115b used for calculating the LLR exchange may be represented by the following equations:

$$Y_{1,1_{R_1 \times 1}} = H_{1_{R_1 \times T}} W_{1_{T\times L_1}} X_{1_{L_1 \times 1}} \quad \text{[Type 1]} \qquad (10)$$

$$Y_{2,2_{R_2 \times 1}} = H_{2_{R_2 \times T}} W_{2_{T\times L_2}} X_{2_{L_2 \times 1}} \quad \text{[Type 1]} \qquad (11)$$

$$Y_{1,2_{R_1 \times 1}} = H_{1_{R_1 \times T}} W_{2_{T\times L_2}} X_{2_{L_2 \times 1}} \quad \text{[Type 2]} \qquad (12)$$

$$Y_{2,1_{R_2 \times 1}} = H_{2_{R_2 \times T}} W_{1_{T\times L_1}} X_{1_{L_1 \times 1}} \quad \text{[Type 2]} \qquad (13)$$

Where the Type 1 equations (10) and (11) represent the received data equations when the cooperative process data is configured to the Type 1 LLR exchange option, and the Type 2 equations (12) and (13) represents the received data equations when the cooperative process data is configured to the Type 2 LLR exchange option.

When configured for the Type 1 LLR exchange option, the rank or number of layers, $L_1$ and $L_2$, for base station 105 to use with the cooperative transmission may be not greater than the maximum number of layers supported by UEs 115a and 115b for processing ($L_1 \leq R_1$ and $L_2 \leq R_2$). In contrast, when configured for the Type 2 LLR exchange option, the maximum of the rank or number of layers, $L_1$ and $L_2$, for base station 105 to use with the cooperative transmission may be not greater than a minimum of the maximum number of layers supported between UEs 115a and 115b for processing (max ($L_1 + L_2) \leq \min(R_1, R_2)$). Thus, again, while the borrowing of receive antennas under the Type 2 LLC exchange option does not increase the rank for cooperative transmissions from base station 105, the borrowing of receive antennas under the Type 1 LLC exchange options may increase the rank, as different layers can be separately demodulated.

The cooperative transmissions may be scheduled via DCI from the serving base station, base station 105, to the set of UEs making up cooperative UE unit 503, UEs 115a and 115b. There may be different means for signaling the TCI states in the DCI depending on the downlink transmission scheme used. For example, when configured for the SU-MIMO transmission scheme, cooperative UE unit 503 may determine multiple sets of channel parameters (e.g., delay spread, Doppler, receive spatial parameters, etc.) corresponding to the multiple sets of receive antennas or the maximum number of layers available for processing at each of UEs 115a-115b ($R_1, R_2$). Based on those sets of channel parameters, UEs 115a-115b may perform separate channel estimation at each set of receive antennas using DMRS.

In a first alternative implementation, the DCI may indicate one TCI state, to which the same RS (e.g., CSI-RS, SSB, etc.) may be linked. That same RS may then be used to determine the multiple sets of channel parameters. In a second alternative implementation, the DCI may indicate multiple TCI states, such as one TCI state per UE in the cooperative UE unit. In such alternative implementation, the separate RS are linked to the separate TCI states which may then be used to separately determine the sets of channel parameters at each cooperating UE, UEs 115a-115b.

For SDM, FDM, or TDM downlink transmission schemes, one of the UEs, UEs 115a-115b, of the cooperative UE unit 503 may determine two sets of channel parameters (e.g., delay spread, Doppler, receive spatial parameters, etc.) corresponding to the two sets of receive antennas. It should be noted that the parameters correspond to two sets of receive antennas because there are two identified UEs, UEs 115a-115b, making up cooperative UE unit 503. The channel parameters may correspond to more than two sets of receive antennas when a given cooperative UE unit includes more than two UEs. Based on that UE performs separate channel estimation at the two sets of Rx antennas using DMRS. In the two-UE case, the signal intended for one of the UEs, e.g., UE 115a, would not be demodulated by the other UE, e.g., UE 115b, in the type one LLR exchange mode. Thus, UE 115 would perform no channel estimation or no demodulation for the other set of layers (for the SDM scheme), other set of RBs (for the FDM scheme), or other set of symbols (for the TDM scheme). In such an example implementation, two TCI states would be indicated at the DCI.

In an alternative implementation for SDM, FDM, or TDM downlink transmission schemes, one of the UEs, UEs 115a-115b, of the cooperative UE unit 503 may determine four sets of channel parameters (e.g., delay spread, Doppler, receive spatial parameters, etc.) corresponding to the two sets of receive antennas and the two transmit beams, as reflected in the two sets of layers for an SDM scheme, the two sets of RBs for an FDM scheme, and the two sets of symbols for an TDM scheme. Based on these four sets of channel parameters, each of UEs 115a and 115b performs separate channel estimation for their own receive antennas and for the two set of resources with the different transmit beams using DMRS. In this case, the signal intended for one of the UEs, e.g., UE 115a, would also be demodulated by the other UE, e.g., UE 1115b in either IAQ or type two LLR exchange mode.

For the processing under the IAQ or type two LLR exchange modes, channel estimation and demodulation are performed also for the other set of layers (for the SDM scheme), for the other set of RBs (for the FDM scheme), or for the other set of symbols (for the TDM scheme) at UEs 115a and 115b. In a first alternative implementation, the DCI may indicate two TCI states corresponding to the two sets of resources. Thus, each RS associated with a given TCI state may be used to determine the two sets of channel parameters at UEs 115a and 115b, respectively. In a second alternative implementation, the DCI may indicate four TCI states corresponding to the two sets of resources and two sets of receive antennas for cooperative unit of UEs 115a and 115b. Thus, four sets of channel parameters may be determined from the RS's linked to the four TCI states.

Figure 6:
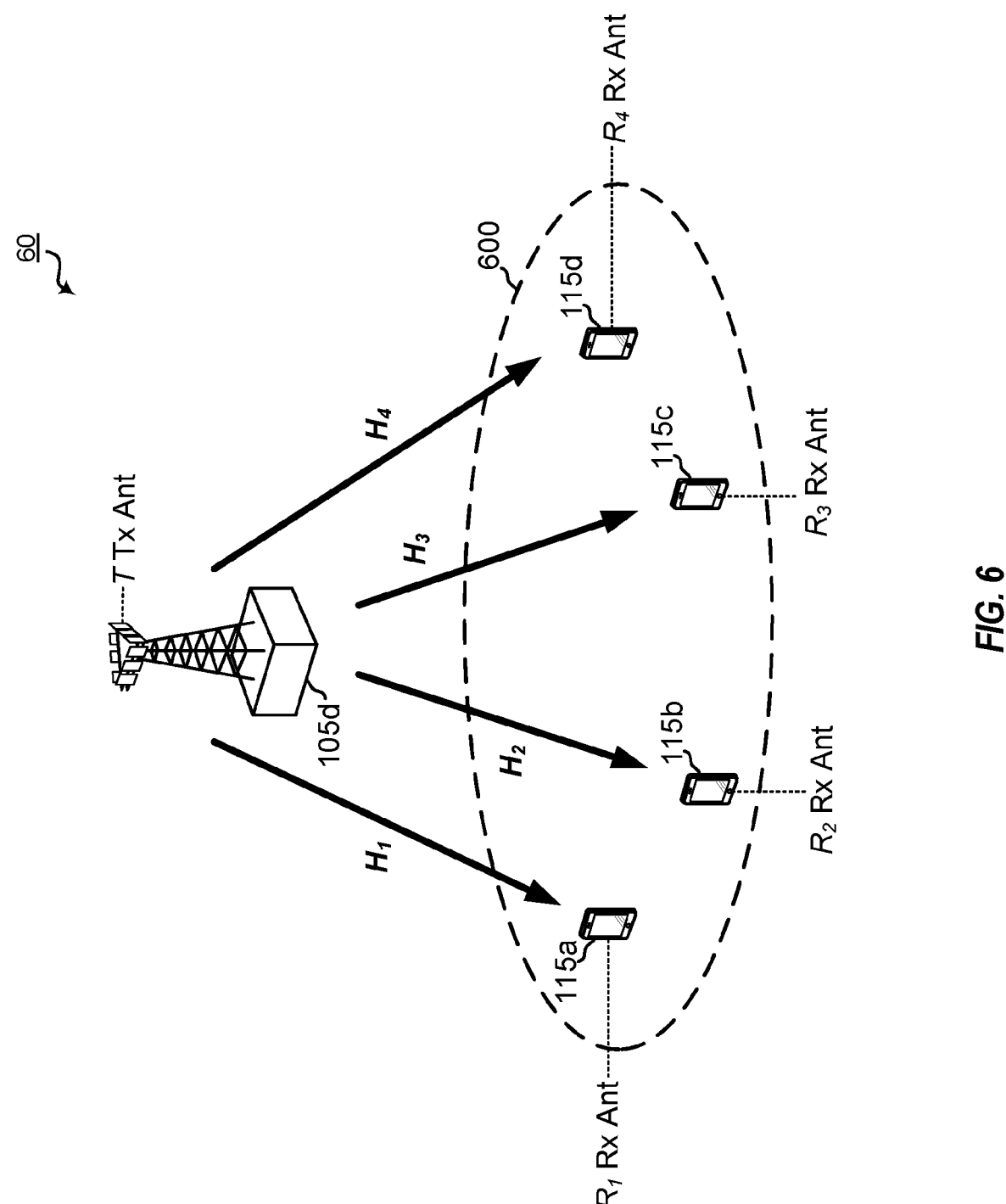
FIG. 6 is a block diagram illustrating a wireless network having a base station and UEs participating together in cooperative UE operations according to one aspect of the present disclosure.

FIG. 6 is a block diagram illustrating wireless network 60 having base station 105 and UEs 115a-115d participating together in cooperative UE operations according to one aspect of the present disclosure. In 3GPP Rel. 16, a maximum of two TCI states are specified for SDM, FDM, and TDM downlink transmission schemes. In the case of cooperative UE operations, however, more than two TCI states or beams may be beneficial, as there may be more than two individual UEs making up a cooperative UE unit, such as UEs 115a-115d making up cooperative UE unit 600. With UEs 115a-115d forming cooperative UE unit 600, one downlink transmission may be configured with four TCI states or beams for each cooperative transmission. Beam 1 may be transmitted to UE 115a, beam 2 may be transmitted to UE 115b, beam 3 may be transmitted to UE 115c, and beam 4 may be transmitted to UE 115d.

It should be noted that combinations of schemes may also be suitable for cooperative UE unit 600. Base station 105 may then combine the downlink transmission schemes for the cooperative transmissions. For example, beam 1 and beam 2 may be transmitted using an SDM scheme, and beam 3 and beam 4 may be transmitted in an SDM scheme. However, the two pairs of beams (beam1/beam2 and beam 3/beam 4) may be transmitted in an FDM or TDM scheme. Alternatively, beam 1 and beam 2 may be transmitted in an SDM scheme, and beam 3 and beam 4 are transmitted in an FDM scheme, while the two pairs of beams are transmitted in a TDM scheme. Any similar combination may be configured in order to accommodate UEs with limited capabilities or to take advantage of current channel conditions. The primary UE, UE 115a, would perform the decoding of the received transmissions after UEs 115b-115d send the corresponding cooperative process data (e.g., IAQ or LLR information exchange) through UE-to-UE communication.

In order to manage the cooperative UE operations, UEs, such as UEs 115a-115d may provide a cooperative UE capability report to base stations, such as base station 105. Base station 105 should be aware of the cooperative UE capability, such as $R_1+R_2$ as a maximum number of MIMO layers. Base station 105 should also be aware of the type of the cooperative process data exchange type between UEs 115a-115d, such as whether IAQ or the LLT type selected for communication. Reporting of additional limitations may be made for LLR types based on the number of scheduled layers available by UEs 115a-115d for processing. Base station 105 should be aware of $R_1$ and $R_2$, in addition to, perhaps, $R_1+R_2$ corresponding to the cooperative UE, such as cooperative UE unit 600. Base station 105 should, in some cases, also be aware of the type of LLR exchange (e.g., type 1 vs. type 2), as the different types can impose additional limitations, such as in the case of SDM, FDM, or TDM operations. These data can be indicated by UEs 115a-115d as a part of the cooperative UE capability report. Base station 105 would use the information of the various capabilities of each of UEs 115a-115d to configure the UEs for a particular mode of operation (e.g., IAQ vs. type 1 or type 2 LLR exchange) in case that the cooperative UE indicates multiple capabilities.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and modules described herein (e.g., the components, functional blocks, and modules in FIG. 2) may comprise processors, electronics devices, hardware devices, electronics components, logical circuits, memories, software codes, firmware codes, etc., or any combination thereof. In addition, features discussed herein relating to provision of downlink schemes for a cooperative UE with joint baseband (BB) processing may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 4A-4C) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various aspects of the present disclosure may be implemented in many different ways, including methods, processes, non-transitory computer-readable medium having program code recorded thereon, apparatus having one or more processors with configurations and instructions for performing the described features and functionality, and the like. A first aspect configured for wireless communication may include establishing, by a UE, a cooperative UE unit with one or more neighboring UEs, wherein the UE operates as the primary UE of the cooperative UE unit; determining, by the UE, a downlink transmission scheme for cooperative transmissions from a serving base station; receiving, by the UE, a transmission of one or more transport blocks from the serving base station according to the downlink transmission scheme; receiving, by the UE, cooperative process data from the one or more neighboring UEs, wherein the cooperative process data is based on a neighboring transmission of the one or more transport blocks by the serving base station as received by the one or more neighboring UEs; and processing, by the UE, the transmission and the cooperative process data to decode the one or more transport blocks.

A second aspect, based on the first aspect, wherein the cooperative process data includes one of: a pre-demodulated received transmission corresponding to the neighboring transmission; or a set of neighboring LLRs resulting from demodulation of the neighboring transmission by the one or more neighboring UEs.

A third aspect, based on the second aspect, wherein the processing includes one of: jointly demodulating the transmission and the pre-demodulated received transmission into a jointly demodulated transmission and decoding the jointly demodulated transmission to decode the one or more transport blocks; or jointly decoding the transmission to decode the one or more transport blocks using the set of neighboring LLRs and a set of LLRs resulting from the UE demodulation of the transmission.

A fourth aspect, based on the third aspect, wherein the set of neighboring LLRs and the set of LLRs correspond to one of: a first LLR type and a second LLR type, wherein the first LLR type includes a set of direct LLRs calculated from coded bits after demodulation of a downlink transmission transmitted directly to a demodulating UE, and wherein the second LLR type includes a set of combined LLRs calculated from the coded bits after the demodulation of the downlink transmission transmitted directly to the demodulating UE and after the demodulation of an indirect downlink transmission transmitted to one or more UEs neighboring the demodulating UE and received by the demodulating UE.

A fifth aspect, based on the fourth aspect, further including: signaling, by the UE, a cooperative UE capability report to the serving base station, wherein the cooperative UE capability report includes one or more of: a cooperative UE capability of the UE; a maximum number of layers supported for processing by the UE; a maximum number of combined layers supported for processing by the UE and the one or more neighboring UEs; a joint demodulation capability of the UE for the transmission and the pre-demodulated received transmission; a first LLR type capability of the UE; and a second LLR type capability of the UE.

A sixth aspect, based on the fifth aspect, further including: receiving, by the UE, in response to the cooperative UE capability report includes at least the joint demodulation capability, the first LLR type capability, and the second LLR type capability, a cooperative UE configuration signal from the serving base station, wherein the cooperative UE configuration signal includes a processing configuration identifying one of: the joint demodulation capability, the first LLR type capability, or the second LLR type capability.

A seventh aspect, based on the fourth aspect, wherein the downlink transmission scheme includes one or more of: a SU-MIMO scheme; a SDM scheme; a NCJT scheme; a TDM scheme; or a FDM scheme.

An eighth aspect, based on the seventh aspect, wherein the downlink transmission scheme is determined to be the SU-MIMO scheme, and wherein the transmission and the neighboring transmission each carry the one or more transport blocks and include a same set of layers transmitted on a same beam from the serving base station.

A ninth aspect, based on the eighth aspect, further including: receiving, by the UE, a DCI message scheduling the transmission, wherein the DCI message indicates one of: a single TCI state or a number of TCI states corresponding to a number of UEs of the cooperative UE unit; determining, by the UE, a set of channel parameters corresponding to a set of receive antennas at the UE, wherein the set of channel parameters is determined using a reference signal associated with a TCI state indicated in the DCI message; and determining, by the UE, a channel estimate for the set of receive antennas receiving the transmission, wherein the channel estimated is determined using the set of channel parameters.

A tenth aspect, based on the eighth aspect, wherein the processing includes the jointly demodulating the transmission and the pre-demodulated received transmission and the decoding the jointly demodulated transmission.

An eleventh aspect based on the eighth aspect, wherein the processing includes the jointly decoding the transmission using the set of neighboring LLRs and the set of LLRs, wherein the set of neighboring LLRs and the set of LLRs are a first LLR type, wherein a number of the same set of layers is no greater than a minimum number of layers supported for processing incoming transmissions between the UE and the one or more neighboring UEs of the cooperative UE unit.

A twelfth aspect, based on the seventh aspect, wherein the downlink transmission scheme is determined to be one of: the SDM scheme, the NCJT scheme, the TDM scheme, or the FDM scheme, wherein the transmission carries a first set of coded symbols on a first set of resources transmitted on a first beam from the serving base station and the neighboring transmission carries a different set of coded symbols on a different set of resources transmitted on a different beam from the serving base station.

A thirteenth aspect, based on the twelfth aspect, wherein the first set of coded symbols and the different set of coded symbols correspond to a same transport block, wherein the same transport block includes one of: a single redundancy value associated with joint rate matching, or a plurality of redundancy values wherein each redundancy value of the plurality of redundancy values is associated with a separate rate matching.

A fourteenth aspect, based on the twelfth aspect, wherein the downlink transmission scheme is determined to be one of: the SDM scheme or the NCJT scheme, wherein the first set of coded symbols and the different set of coded symbols correspond to a different transport block.

A fifteenth aspect, based on the twelfth aspect, wherein the processing includes the jointly demodulating the transmission and the pre-demodulated received transmission and the decoding the jointly demodulated transmission, wherein the transmission includes a first transmission component corresponding to a direct transmission from the serving base station to the UE and a second transmission component corresponding to an indirect transmission from the serving base station to the one or more neighboring UEs received by the UE, and the pre-modulated received transmission includes a first neighboring component corresponding to a direct neighboring transmission from the serving base station to the one or more neighboring UEs and a second neighboring component corresponding to an indirect neighboring transmission of the transmission from the serving base station to the UE received by the one or more neighboring UEs.

A sixteenth aspect, based on the twelfth aspect, wherein the processing includes the jointly decoding the transmission using the set of neighboring LLRs and the set of LLRs, wherein the set of neighboring LLRs and the set of LLRs are one of a first LLR type or a second LLR type.

A seventeenth aspect, based on the sixteenth aspect, wherein the downlink transmission scheme is determined to be one of: the SDM scheme or the NCJT scheme, when the set of neighboring LLRs and the set of LLRs are the first LLR type, a number of a first set of layers for the transmission is no greater than a maximum number of layers supported for processing by the UE and a number of a different set of layers for the neighboring transmission is no greater than a maximum number of neighboring layers supported for processing by a receiving neighboring UE of the one or more neighboring UEs, and when the set of neighboring LLRs and the set of LLRs are the second LLR type, a sum of the first set of layers for the transmission and the different set of layers for the neighboring transmission is no greater than a minimum number of layers between the maximum number of layers supported for processing by the UE and the maximum number of neighboring layers supported for processing by the one or more neighboring UEs.

An eighteenth aspect, based on the sixteenth aspect, wherein the downlink transmission scheme is determined to be one of: the TDM scheme or the FDM scheme, when the set of neighboring LLRs and the set of LLRs are the first LLR type, a number of a first set of layers for the transmission is no greater than a maximum number of layers supported for processing by the UE and a number of a different set of layers for the neighboring transmission is no greater than a maximum number of neighboring layers supported for processing by a receiving neighbor UE of the one or more neighboring UEs, and when the set of neighboring LLRs and the set of LLRs are the second LLR type, a maximum number of layers between the first set of layers of the transmission and the different set of layers of the neighboring transmission is no greater than a minimum number of layers between the maximum number of layers supported for processing by the UE and the maximum number of neighboring layers supported for processing by the one or more neighboring UEs.

A nineteenth aspect, based on the seventeenth aspect, further including: receiving, by the UE, a DCI message scheduling the transmission, wherein the DCI message indicates a plurality of TCI states; determining, by the UE, a set of channel parameters using at least one reference signal associated with at least one TCI state of the plurality of TCI states indicated in the DCI message; and determining, by the UE, a channel estimate using the set of channel parameters.

A twentieth aspect, based on the nineteenth aspect, wherein the set of channel parameters is determined for a set of receive antennas at the UE, and wherein the channel estimate is determined for the set of receive antennas receiving the transmission.

A twenty-first aspect, based on the nineteenth aspect, wherein the set of LLRs and the set of neighboring LLRs includes the second LLR type, wherein the set of channel parameters is determined for a set of receive antennas at the UE and the first beam, and wherein the channel estimate is determined for the set of receive antennas and the first set of resources.

A twenty-second aspect, based on the twenty-first aspect, wherein the set of channel parameters is determined from at least one reference signal linked to one of: the at least one TCI state corresponding to the first set of resources; or the at least one TCI state corresponding to the first set of resources and a set of receive antennas at the UE.

A twenty-third aspect includes any combination of the first aspect through the twenty-second aspect.

A twenty-fourth aspect configured for wireless communication may include cooperating, by a UE, with a primary UE to form a cooperative UE unit; determining, by the UE, a downlink transmission scheme for cooperative transmissions from a serving base station; receiving, by the UE, a cooperative transmission of one or more transport blocks from the serving base station according to the downlink transmission scheme; generating, by the UE, cooperative process data from the cooperative transmission; and transmitting, by the UE, the cooperative process data to the primary UE.

A twenty-fifth aspect, based on the twenty-fourth aspect, wherein the generating the cooperative process data includes one of: generating a pre-demodulated received transmission corresponding to the received cooperative transmission prior to demodulation; or demodulating the cooperative transmission and calculating a set of cooperative LLRs from coded bits of the demodulated cooperative transmission.

A twenty-sixth aspect, based on the twenty-fifth aspect, wherein the set of cooperative LLRs correspond to one of: a first LLR type and a second LLR type, wherein the first LLR type includes a set of direct LLRs calculated after demodulation of the cooperative transmission transmitted directly to the UE, and wherein the second LLR type includes a set of combined LLRs calculated after the demodulation of the cooperative transmission transmitted directly to the UE and after the demodulation of a primary transmission transmitted to the primary UE and received by the UE.

A twenty-seventh aspect, based on the twenty-sixth aspect, further including: signaling, by the UE, a cooperative UE capability report to the serving base station, wherein the cooperative UE capability report includes one or more of: a cooperative UE capability of the UE; a maximum number of layers supported for processing by the UE; a maximum number of combined layers supported for processing by the UE and the one or more neighboring UEs; a joint demodulation capability of the UE for the cooperative transmission and the pre-demodulated received transmission; a first LLR type capability of the UE; and a second LLR type capability of the UE.

A twenty-eighth aspect, based on the twenty-seventh aspect, further including: receiving, by the UE, in response to the cooperative UE capability report includes at least the joint demodulation capability, the first LLR type capability, and the second LLR type capability, a cooperative UE configuration signal from the serving base station, wherein the cooperative UE configuration signal includes a processing configuration identifying one of: the joint demodulation capability, the first LLR type capability, or the second LLR type capability.

A twenty-ninth aspect, based on the twenty-sixth aspect, wherein the downlink transmission scheme includes one or more of: a SU-MIMO scheme; a SDM scheme; a NCJT scheme; a TDM scheme; or a FDM scheme.

A thirtieth aspect, based on the twenty-ninth aspect, wherein the downlink transmission scheme is determined to be the SU-MIMO scheme, and wherein the cooperative transmission and a primary transmission from the serving base station to the primary UE each carry the one or more transport blocks and include a same set of layers transmitted on a same beam from the serving base station.

A thirty-first aspect, based on the thirtieth aspect, further including: receiving, by the UE, a DCI message scheduling the cooperative transmission, wherein the DCI message indicates one of: a single TCI state or a number of TCI states corresponding to a number of UEs of the cooperative UE unit; determining, by the UE, a set of channel parameters corresponding to a set of receive antennas at the UE, wherein the set of channel parameters is determined using a reference signal associated with a TCI state indicated in the DCI message; and determining, by the UE, a channel estimate for the set of receive antennas receiving the cooperative transmission, wherein the channel estimated is determined using the set of channel parameters.

A thirty-second aspect, based on the thirtieth aspect, wherein the generating the cooperative process data includes the generating the pre-demodulated received transmission corresponding to the received cooperative transmission prior to the demodulation.

A thirty-third aspect, based on the thirtieth aspect, wherein the generating the cooperative process data includes the demodulating the cooperative transmission and the calculating the set of cooperative LLRs, wherein the set of cooperative LLRs is a first LLR type, wherein a number of the same set of layers corresponds to a minimum number of layers supported for processing incoming transmissions between the UE and the primary UE.

A thirty-fourth aspect, based on the twenty-ninth aspect, wherein the downlink transmission scheme is determined to be one of: the SDM scheme, the NCJT scheme, the TDM scheme, or the FDM scheme, wherein the cooperative transmission carries a first set of coded symbols on a first set of resources transmitted on a first beam from the serving base station and the primary transmission carries a different set of coded symbols on a different set of resources transmitted on a different beam from the serving base station.

A thirty-fifth aspect, based on the thirty-fourth aspect, wherein the first set of coded symbols and the different set of coded symbols correspond to a same transport block, wherein the same transport block includes one of: a single redundancy value associated with joint rate matching, or a plurality of redundancy values wherein each redundancy value of the plurality of redundancy values is associated with a separate rate matching.

A thirty-sixth aspect, based on the thirty-fourth aspect, wherein the downlink transmission scheme is determined to be one of: the SDM scheme or the NCJT scheme, wherein the first set of coded symbols and the different set of coded symbols correspond to a different transport block.

A thirty-seventh aspect, based on the thirty-fourth aspect, wherein the generating the cooperative process data includes the generating the pre-demodulated received transmission corresponding to the received cooperative transmission prior to the demodulation, wherein the pre-demodulated received transmission includes a first component corresponding to the cooperative transmission from the serving base station to the UE and a second transmission component corresponding to a primary transmission from the serving base station to the primary UE received by the UE.

A thirty-eighth aspect, based on the thirty-fourth aspect, wherein the generating the cooperative process data includes the demodulating the cooperative transmission and the calculating the set of cooperative LLRs, wherein the set of cooperative LLRs corresponds to one of: a first LLR type or a second LLR type.

A thirty-ninth aspect, based on the thirty-eighth aspect, wherein the downlink transmission scheme is determined to be one of: the SDM scheme or the NCJT scheme, when the set of cooperative LLRs corresponds to the first LLR type, a number of a first set of layers for the cooperative transmission is no greater than a maximum number of layers supported for processing by the UE and a number of a first set of primary layers for the primary transmission is no greater than a maximum number of layers supported for processing by the primary UE, and when the set of cooperative LLRs corresponds to the second LLR type, a sum of the first set of layers and a primary set of layers for the primary transmission is no greater than a minimum number of layers between a maximum number of layers supported for processing by the UE and a maximum number of primary layers supported for processing by the primary UE.

A fortieth aspect, based on the thirty-eighth aspect, wherein the downlink transmission scheme is determined to be one of: the TDM scheme or the FDM scheme, when the set of cooperative LLRs correspond to the first LLR type, a number of a first set of layers for the cooperative transmission is no greater than a maximum number of layers supported for processing by the UE and a number of a first set of primary layers for the primary transmission is no greater than a maximum number of layers supported for processing by the primary UE, and when the set of cooperative LLRs correspond to the second LLR type, a maximum number of layers supported by processing between the UE and the primary UE is not greater than a minimum number of layers between a maximum number of layers supported for processing by the UE and a maximum number of primary layers supported for processing by the primary UE.

A forty-first aspect, based on the thirty-fourth aspect, further including: receiving, by the UE, a DCI message scheduling the cooperative transmission, wherein the DCI message indicates a plurality of TCI states; determining, by the UE, a set of channel parameters using at least one reference signal associated with at least one TCI state of the plurality of TCI states indicated in the DCI message; and determining, by the UE, a channel estimate using the set of channel parameters.

A forty-second aspect, based on the forty-first aspect, wherein the set of channel parameters is determined for a set of receive antennas at the UE, and wherein the channel estimate is determined for the set of receive antennas receiving the cooperative transmission.

A forty-third aspect, based on the forty-first aspect, wherein the set of channel parameters is determined for a set of receive antennas at the UE and the first beam, and wherein the channel estimate is determined for the set of receive antennas and the first set of resources.

A forty-fourth aspect, based on the forty-third aspect, wherein the set of channel parameters is determined from at least one reference signal linked to one of: the at least one TCI state corresponding to the first set of resources; or the at least one TCI state corresponding to the first set of resources and a set of receive antennas at the UE.

A forty-fifth aspect includes any combination of the twenty-fourth aspect through the forty-fourth aspect.

A forty-sixth aspect configured for wireless communication includes receiving, at a base station, a cooperative UE capability report from a plurality of served UEs, wherein the cooperative UE capability report includes UE capabilities and at least an indication of a cooperative UE unit formed by a set of UEs of the plurality of served UEs; scheduling, by the base station, transmission of a set of cooperative transmissions according to the UE capabilities of the cooperative UE unit, wherein the set of cooperative transmissions includes a cooperative transmission for each UE of the set of UEs; signaling, by the base station, a DCI to the set of UEs, wherein the DCI identifies a schedule of the set of cooperative transmissions and a downlink transmission scheme for the transmission of each cooperative transmission of the set of cooperative transmissions; and transmitting, by the base station, each cooperative transmission of the set of cooperative transmissions according to the UE capabilities at the downlink transmission scheme to a corresponding UE of the set of UEs of the cooperative UE unit.

A forty-seventh aspect, based on the forty-sixth aspect, wherein the UE capabilities reported in the cooperative UE capability report includes one or more of: a cooperative UE capability of the UE; a maximum number of layers supported for processing by the UE; a maximum number of combined layers supported for processing by the UE and the one or more neighboring UEs; a joint demodulation capability of the UE for two or more cooperative transmissions of the set of cooperative transmissions; a first LLR type capability of the UE; and a second LLR type capability of the UE.

A forty-eighth aspect, based on the forty-seventh aspect, further including: transmitting, by the base station, in response to the cooperative UE capability report including at least the joint demodulation capability, the first LLR type capability, and the second LLR type capability, a cooperative UE configuration signal to each UE of the set of UE from which the cooperative UE capability report is received including the at least the joint demodulation capability, the first LLR type capability, and the second LLR type capability, wherein the cooperative UE configuration signal includes a processing configuration identifying one of: the joint demodulation capability, the first LLR type capability, or the second LLR type capability.

A forty-ninth aspect, based on the forty-eighth aspect, wherein the first LLR type capability includes a capability for generation of a set of direct LLRs calculated from coded bits after demodulation of a downlink transmission transmitted directly to a demodulating UE, and wherein the second LLR type capability includes a capability for generation of a set of combined LLRs calculated from the coded bits after the demodulation of the downlink transmission transmitted directly to the demodulating UE and after the demodulation of an indirect downlink transmission transmitted to another UE of the set of UEs and received by the demodulating UE.

A fiftieth aspect, based on the forty-ninth aspect, wherein the downlink transmission scheme includes one or more of: a SU-MIMO scheme; a SDM scheme; a NCJT scheme; a TDM scheme; or a FDM scheme.

A fifty-first aspect, based on the fiftieth aspect, wherein the downlink transmission scheme is determined to be the SU-MIMO scheme, and wherein the each cooperative transmission transmitted according to the SU-MIMO scheme carries a same set of one or more transport blocks and includes a same set of layers transmitted on a same beam.

A fifty-second aspect, based on the fifty-first aspect, wherein the DCI message indicates one of: a single TCI state or a number of TCI states corresponding to a number of UEs of the set of UEs.

A fifty-third aspect based on the fiftieth aspect, wherein the downlink transmission scheme is determined to be one of: the SDM scheme, the NCJT scheme, the TDM scheme, or the FDM scheme, wherein the each cooperative transmission transmitted according to the downlink transmission scheme carries a different set of coded symbols on a different set of resources transmitted on a different.

A fifty-fourth aspect, based on the fifty-third aspect, wherein the different set of coded symbols correspond to a same transport block, wherein the same transport block includes one of: a single redundancy value associated with joint rate matching, or a plurality of redundancy values wherein each redundancy value of the plurality of redundancy values is associated with a separate rate matching.

A fifty-fifth aspect, based on the fifty-third aspect, wherein the downlink transmission scheme is determined to be one of: the SDM scheme or the NCJT scheme, wherein the different set of coded symbols each correspond to a different transport block.

A fifty-sixth aspect, based on the fifty-fifth aspect, wherein, when the set of UEs use the first LLR type, a number of layers of each set of transmission layers for each receiving UE of the set of UEs is no greater than a maximum number of layers supported for processing between the each receiving UE of the set of UEs to which the each cooperative transmission is transmitted, and when the set of UEs use the second LLR type, a sum of the number of layers of each set of transmission layers for each receiving UE of the set of UEs is no greater than a minimum number of layers supported for processing between the each receiving UE of the set of UEs.

A fifty-seventh aspect, based on the fifty-third aspect, wherein the downlink transmission scheme is determined to be one of: the TDM scheme or the FDM scheme, when the set of UEs use the first LLR type, a number of layers of each set of transmission layers for each receiving UE of the set of UEs is no greater than a maximum number of layers supported for processing between the each receiving UE of the set of UEs to which the each cooperative transmission is transmitted, and when the set of UEs use the second LLR type, a maximum number of layers of each set of transmission layers for each receiving UE of the set of UEs is no greater than a minimum number of layers supported for processing between the each receiving UE of the set of UEs.

A fifty-eighth aspect, based on the fifty-third aspect, wherein the DCI message indicates a plurality of TCI states.

A fifty-ninth aspect includes any combination of the forty-sixth aspect through the fifty-eighth aspect.

A sixtieth aspect configured for wireless communication includes means for establishing, by a UE, a cooperative UE unit with one or more neighboring UEs, wherein the UE operates as the primary UE of the cooperative UE unit; means for determining, by the UE, a downlink transmission scheme for cooperative transmissions from a serving base station; means for receiving, by the UE, a transmission of one or more transport blocks from the serving base station according to the downlink transmission scheme; means for receiving, by the UE, cooperative process data from the one or more neighboring UEs, wherein the cooperative process data is based on a neighboring transmission of the one or more transport blocks by the serving base station as received by the one or more neighboring UEs; and means for processing, by the UE, the transmission and the cooperative process data to decode the one or more transport blocks.

A sixty-first aspect, based on the sixtieth aspect, wherein the cooperative process data includes one of: a pre-demodulated received transmission corresponding to the neighboring transmission; or a set of neighboring LLRs resulting from demodulation of the neighboring transmission by the one or more neighboring UEs.

A sixty-second aspect, based on the sixty-first aspect, wherein the means for processing includes one of: means for jointly demodulating the transmission and the pre-demodulated received transmission into a jointly demodulated transmission and decoding the jointly demodulated transmission to decode the one or more transport blocks; or means for jointly decoding the transmission to decode the one or more transport blocks using the set of neighboring LLRs and a set of LLRs resulting from the UE demodulation of the transmission.

A sixty-third aspect, based on the sixty-second aspect, wherein the set of neighboring LLRs and the set of LLRs correspond to one of: a first LLR type and a second LLR type, wherein the first LLR type includes a set of direct LLRs calculated from coded bits after demodulation of a downlink transmission transmitted directly to a demodulating UE, and wherein the second LLR type includes a set of combined LLRs calculated from the coded bits after the demodulation of the downlink transmission transmitted directly to the demodulating UE and after the demodulation of an indirect downlink transmission transmitted to one or more UEs neighboring the demodulating UE and received by the demodulating UE.

A sixty-fourth aspect, based on the sixty-third aspect, further including: means for signaling, by the UE, a cooperative UE capability report to the serving base station, wherein the cooperative UE capability report includes one or more of: a cooperative UE capability of the UE; a maximum number of layers supported for processing by the UE; a maximum number of combined layers supported for processing by the UE and the one or more neighboring UEs; a joint demodulation capability of the UE for the transmission and the pre-demodulated received transmission; a first LLR type capability of the UE; and a second LLR type capability of the UE.

A sixty-fifth aspect, based on the sixty-fourth aspect, further including: means for receiving, by the UE, in response to the cooperative UE capability report includes at least the joint demodulation capability, the first LLR type capability, and the second LLR type capability, a cooperative UE configuration signal from the serving base station, wherein the cooperative UE configuration signal includes a processing configuration identifying one of: the joint demodulation capability, the first LLR type capability, or the second LLR type capability.

A sixty-sixth aspect, based on the sixty-third aspect, wherein the downlink transmission scheme includes one or more of: a SU-MIMO scheme; a SDM scheme; a NCJT scheme; a TDM scheme; or a FDM scheme.

A sixty-seventh aspect, based on the sixty-sixth aspect, wherein the downlink transmission scheme is determined to be the SU-MIMO scheme, and wherein the transmission and the neighboring transmission each carry the one or more transport blocks and include a same set of layers transmitted on a same beam from the serving base station.

A sixty-eighth aspect, based on the sixty-seventh aspect, further including: means for receiving, by the UE, a DCI message scheduling the transmission, wherein the DCI message indicates one of: a single TCI state or a number of TCI states corresponding to a number of UEs of the cooperative UE unit; means for determining, by the UE, a set of channel parameters corresponding to a set of receive antennas at the UE, wherein the set of channel parameters is determined using a reference signal associated with a TCI state indicated in the DCI message; and means for determining, by the UE, a channel estimate for the set of receive antennas receiving the transmission, wherein the channel estimated is determined using the set of channel parameters.

A sixty-ninth aspect, based on the sixty-seventh aspect, wherein the means for processing includes the means for jointly demodulating the transmission and the pre-demodulated received transmission and the means for decoding the jointly demodulated transmission.

A seventieth aspect, based on the sixty-seventh aspect, wherein the means for processing includes the means for jointly decoding the transmission using the set of neighboring LLRs and the set of LLRs, wherein the set of neighboring LLRs and the set of LLRs are a first LLR type, wherein a number of the same set of layers is no greater than a minimum number of layers supported for processing incoming transmissions between the UE and the one or more neighboring UEs of the cooperative UE unit.

A seventy-first aspect, based on the sixty-sixth aspect, wherein the downlink transmission scheme is determined to be one of: the SDM scheme, the NCJT scheme, the TDM scheme, or the FDM scheme, wherein the transmission carries a first set of coded symbols on a first set of resources transmitted on a first beam from the serving base station and the neighboring transmission carries a different set of coded symbols on a different set of resources transmitted on a different beam from the serving base station.

A seventy-second aspect, based on the seventy-first aspect, wherein the first set of coded symbols and the different set of coded symbols correspond to a same transport block, wherein the same transport block includes one of: a single redundancy value associated with joint rate matching, or a plurality of redundancy values wherein each redundancy value of the plurality of redundancy values is associated with a separate rate matching.

A seventy-third aspect, based on the seventy-first aspect, wherein the downlink transmission scheme is determined to be one of: the SDM scheme or the NCJT scheme, wherein the first set of coded symbols and the different set of coded symbols correspond to a different transport block.

A seventy-fourth aspect, based on the seventy-first aspect, wherein the means for processing includes the means for jointly demodulating the transmission and the pre-demodulated received transmission and the means for decoding the jointly demodulated transmission, wherein the transmission includes a first transmission component corresponding to a direct transmission from the serving base station to the UE and a second transmission component corresponding to an indirect transmission from the serving base station to the one or more neighboring UEs received by the UE, and the pre-modulated received transmission includes a first neighboring component corresponding to a direct neighboring transmission from the serving base station to the one or more neighboring UEs and a second neighboring component corresponding to an indirect neighboring transmission of the transmission from the serving base station to the UE received by the one or more neighboring UEs.

A seventy-fifth aspect, based on the seventy-first aspect, wherein the means for processing includes the means for jointly decoding the transmission using the set of neighboring LLRs and the set of LLRs, wherein the set of neighboring LLRs and the set of LLRs are one of a first LLR type or a second LLR type.

A seventy-sixth aspect, based on the seventy-fifth aspect, wherein the downlink transmission scheme is determined to be one of: the SDM scheme or the NCJT scheme, when the set of neighboring LLRs and the set of LLRs are the first LLR type, a number of a first set of layers for the transmission is no greater than a maximum number of layers supported for processing by the UE and a number of a different set of layers for the neighboring transmission is no greater than a maximum number of neighboring layers supported for processing by a receiving neighboring UE of the one or more neighboring UEs, and when the set of neighboring LLRs are the set of LLRs are the second LLR type, a sum of the first set of layers for the transmission and the different set of layers for the neighboring transmission is no greater than a minimum number of layers between the maximum number of layers supported for processing by the UE and the maximum number of neighboring layers supported for processing by the one or more neighboring UEs.

A seventy-seventh aspect, based on the seventy-fifth aspect, wherein the downlink transmission scheme is determined to be one of: the TDM scheme or the FDM scheme, when the set of neighboring LLRs and the set of LLRs are the first LLR type, a number of a first set of layers for the transmission is no greater than a maximum number of layers supported for processing by the UE and a number of a different set of layers for the neighboring transmission is no greater than a maximum number of neighboring layers supported for processing by a receiving neighbor UE of the one or more neighboring UEs, and when the set of neighboring LLRs and the set of LLRs are the second LLR type, a maximum number of layers between the first set of layers of the transmission and the different set of layers of the neighboring transmission is no greater than a minimum number of layers between the maximum number of layers supported for processing by the UE and the maximum number of neighboring layers supported for processing by the one or more neighboring UEs.

A seventy-eighth aspect, based on the seventy-sixth aspect, further including: means for receiving, by the UE, a DCI message scheduling the transmission, wherein the DCI message indicates a plurality of TCI states; means for determining, by the UE, a set of channel parameters using at least one reference signal associated with at least one TCI state of the plurality of TCI states indicated in the DCI message, and means for determining, by the UE, a channel estimate using the set of channel parameters.

A seventy-ninth aspect, based on the seventy-eighth aspect, wherein the set of channel parameters is determined for a set of receive antennas at the UE, and wherein the channel estimate is determined for the set of receive antennas receiving the transmission.

An eightieth aspect, based on the seventy-eighth aspect, wherein the set of LLRs and the set of neighboring LLRs includes the second LLR type, wherein the set of channel parameters is determined for a set of receive antennas at the UE and the first beam, and wherein the channel estimate is determined for the set of receive antennas and the first set of resources.

An eighty-first aspect, based on the eightieth aspect, wherein the set of channel parameters is determined from at least one reference signal linked to one of: the at least one TCI state corresponding to the first set of resources; or the at least one TCI state corresponding to the first set of resources and a set of receive antennas at the UE.

An eighty-second aspect includes any combination of the sixtieth aspect through the eighty-first aspect.

An eighty-third aspect configured for wireless communication may include means for cooperating, by a UE, with a primary UE to form a cooperative UE unit; means for determining, by the UE, a downlink transmission scheme for cooperative transmissions from a serving base station; means for receiving, by the UE, a cooperative transmission of one or more transport blocks from the serving base station according to the downlink transmission scheme; means for generating, by the UE, cooperative process data from the cooperative transmission; and means for transmitting, by the UE, the cooperative process data to the primary UE.

An eighty-fourth aspect, based on the eighty-third aspect, wherein the means for generating the cooperative process data includes one of: means for generating a pre-demodulated received transmission corresponding to the received cooperative transmission prior to demodulation; or means for demodulating the cooperative transmission and means for calculating a set of cooperative LLRs from coded bits of the demodulated cooperative transmission.

An eighty-fifth aspect, based on the eighty-fourth aspect, wherein the set of cooperative LLRs corresponds to one of: a first LLR type and a second LLR type, wherein the first LLR type includes a set of direct LLRs calculated after demodulation of the cooperative transmission transmitted directly to the UE, and wherein the second LLR type includes a set of combined LLRs calculated after the demodulation of the cooperative transmission transmitted directly to the UE and after the demodulation of a primary transmission transmitted to the primary UE and received by the UE.

An eighty-sixth aspect, based on the eighty-fifth aspect, further including: means for signaling, by the UE, a cooperative UE capability report to the serving base station, wherein the cooperative UE capability report includes one or more of: a cooperative UE capability of the UE; a maximum number of layers supported for processing by the UE; a maximum number of combined layers supported for processing by the UE and the one or more neighboring UEs; a joint demodulation capability of the UE for the cooperative transmission and the pre-demodulated received transmission; a first LLR type capability of the UE; and a second LLR type capability of the UE.

An eighty-seventh aspect, based on the eighty-sixth aspect, further including: means for receiving, by the UE, in response to the cooperative UE capability report includes at least the joint demodulation capability, the first LLR type capability, and the second LLR type capability, a cooperative UE configuration signal from the serving base station, wherein the cooperative UE configuration signal includes a processing configuration identifying one of: the joint demodulation capability, the first LLR type capability, or the second LLR type capability.

An eighty-eighth aspect, based on the eighty-fifth aspect, wherein the downlink transmission scheme includes one or more of a SU-MIMO scheme; a SDM scheme; a NCJT scheme; a TDM scheme; or a FDM scheme.

An eighty-ninth aspect, based on the eighty-eighth aspect, wherein the downlink transmission scheme is determined to be the SU-MIMO scheme, and wherein the cooperative transmission and a primary transmission from the serving base station to the primary UE each carry the one or more transport blocks and include a same set of layers transmitted on a same beam from the serving base station.

A ninetieth aspect, based on the eighty-ninth aspect, further including: means for receiving, by the UE, a DCI message scheduling the cooperative transmission, wherein the DCI message indicates one of: a single TCI state or a number of TCI states corresponding to a number of UEs of the cooperative UE unit; means for determining, by the UE, a set of channel parameters corresponding to a set of receive antennas at the UE, wherein the set of channel parameters is determined using a reference signal associated with a TC state indicated in the DCI message; and means for determining, by the UE, a channel estimate for the set of receive antennas receiving the cooperative transmission, wherein the channel estimated is determined using the set of channel parameters.

A ninety-first aspect, based on the eighty-ninth aspect, wherein the means for generating the cooperative process data includes the means for generating the pre-demodulated received transmission corresponding to the received cooperative transmission prior to the demodulation.

A ninety-second aspect, based on the eighty-ninth aspect, wherein the means for generating the cooperative process data includes the means for demodulating the cooperative transmission and the means for calculating the set of cooperative LLRs, wherein the set of cooperative LLRs is a first LLR type, wherein a number of the same set of layers corresponds to a minimum number of layers supported for processing incoming transmissions between the UE and the primary UE.

A ninety-third aspect, based on the eighty-eighth aspect, wherein the downlink transmission scheme is determined to be one of: the SDM scheme, the NCJT scheme, the TDM scheme, or the FDM scheme, wherein the cooperative transmission carries a first set of coded symbols on a first set of resources transmitted on a first beam from the serving base station and the primary transmission carries a different set of coded symbols on a different set of resources transmitted on a different beam from the serving base station.

A ninety-fourth aspect, based on the ninety-third aspect, wherein the first set of coded symbols and the different set of coded symbols correspond to a same transport block, wherein the same transport block includes one of: a single redundancy value associated with joint rate matching, or a plurality of redundancy values wherein each redundancy value of the plurality of redundancy values is associated with a separate rate matching.

A ninety-fifth aspect, based on the ninety-third aspect, wherein the downlink transmission scheme is determined to be one of: the SDM scheme or the NCJT scheme, wherein the first set of coded symbols and the different set of coded symbols correspond to a different transport block.

A ninety-sixth aspect, based on the ninety-third aspect, wherein the means for generating the cooperative process data includes the means for generating the pre-demodulated received transmission corresponding to the received cooperative transmission prior to the demodulation, wherein the pre-demodulated received transmission includes a first component corresponding to the cooperative transmission from the serving base station to the UE and a second transmission component corresponding to a primary transmission from the serving base station to the primary UE received by the UE.

A ninety-seventh aspect, based on the ninety-third aspect, wherein the means for generating the cooperative process data includes the means for demodulating the cooperative transmission and the means for calculating the set of cooperative LLRs, wherein the set of cooperative LLRs corresponds to one of: a first LLR type or a second LLR type.

A ninety-eighth aspect, based on the ninety-seventh aspect, wherein the downlink transmission scheme is determined to be one of: the SDM scheme or the NCJT scheme, when the set of cooperative LLRs corresponds to the first LLR type, a number of a first set of layers for the cooperative transmission is no greater than a maximum number of layers supported for processing by the UE and a number of a first set of primary layers for the primary transmission is no greater than a maximum number of layers supported for processing by the primary UE, and when the set of cooperative LLRs corresponds to the second LLR type, a sum of the first set of layers and a primary set of layers for the primary transmission is no greater than a minimum number of layers between a maximum number of layers supported for processing by the UE and a maximum number of primary layers supported for processing by the primary UE.

A ninety-ninth aspect, based on the ninety-seventh aspect, wherein the downlink transmission scheme is determined to be one of: the TDM scheme or the FDM scheme, when the set of cooperative LLRs correspond to the first LLR type, a number of a first set of layers for the cooperative transmission is no greater than a maximum number of layers supported for processing by the UE and a number of a first set of primary layers for the primary transmission is no greater than a maximum number of layers supported for processing by the primary UE, and when the set of cooperative LLRs correspond to the second LLR type, a maximum number of layers supported by processing between the UE and the primary UE is not greater than a minimum number of layers between a maximum number of layers supported for processing by the UE and a maximum number of primary layers supported for processing by the primary UE.

A one hundredth aspect, based on the ninety-third aspect, means for receiving, by the UE, a DCI message scheduling the cooperative transmission, wherein the DCI message indicates a plurality of TCI states; means for determining, by the UE, a set of channel parameters using at least one reference signal associated with at least one TCI state of the plurality of TCI states indicated in the DCI message; and means for determining, by the UE, a channel estimate using the set of channel parameters.

A one hundred-first aspect, based on the one hundredth aspect, wherein the set of channel parameters is determined for a set of receive antennas at the UE, and wherein the channel estimate is determined for the set of receive antennas receiving the cooperative transmission.

A one hundred-second aspect, based on the one hundredth aspect, wherein the set of channel parameters is determined for a set of receive antennas at the UE and the first beam, and wherein the channel estimate is determined for the set of receive antennas and the first set of resources.

A one hundred-third aspect, based on the one hundred-second aspect, wherein the set of channel parameters is determined from at least one reference signal linked to one of: the at least one TCI state corresponding to the first set of resources; or the at least one TCI state corresponding to the first set of resources and a set of receive antennas at the UE.

A one hundred-fourth aspect includes any combination of the eighty-third aspect through the one hundred-third aspect.

A one hundred-fifth aspect configured for wireless communication may include means for receiving, at a base station, a cooperative UE capability report from a plurality of served UEs, wherein the cooperative UE capability report includes UE capabilities and at least an indication of a cooperative UE unit formed by a set of UEs of the plurality of served UEs; means for scheduling, by the base station, transmission of a set of cooperative transmissions according to the UE capabilities of the cooperative UE unit, wherein the set of cooperative transmissions includes a cooperative transmission for each UE of the set of UEs; means for signaling, by the base station, a DCI to the set of UEs, wherein the DCI identifies a schedule of the set of cooperative transmissions and a downlink transmission scheme for the transmission of each cooperative transmission of the set of cooperative transmissions, and means for transmitting, by the base station, each cooperative transmission of the set of cooperative transmissions according to the UE capabilities at the downlink transmission scheme to a corresponding UE of the set of UEs of the cooperative UE unit.

A one hundred-sixth aspect, based on the one hundred-fifth aspect, wherein the UE capabilities reported in the cooperative UE capability report includes one or more of: a cooperative UE capability of the UE; a maximum number of layers supported for processing by the UE; a maximum number of combined layers supported for processing by the UE and the one or more neighboring UEs; a joint demodulation capability of the UE for two or more cooperative transmissions of the set of cooperative transmissions; a first LLR type capability of the UE; and a second LLR type capability of the UE.

A one hundred-seventh aspect, based on the one hundred-sixth aspect, further including: means for transmitting, by the base station, in response to the cooperative UE capability report including at least the joint demodulation capability, the first LLR type capability, and the second LLR type capability, a cooperative UE configuration signal to each UE of the set of UE from which the cooperative UE capability report is received including the at least the joint demodulation capability, the first LLR type capability, and the second LLR type capability, wherein the cooperative UE configuration signal includes a processing configuration identifying one of: the joint demodulation capability, the first LLR type capability, or the second LLR type capability.

A one hundred-eighth aspect, based on the one hundred-seventh aspect, wherein the first LLR type capability includes a capability for generation of a set of direct LLRs calculated from coded bits after demodulation of a downlink transmission transmitted directly to a demodulating UE, and wherein the second LLR type capability includes a capability for generation of a set of combined LLRs calculated from the coded bits after the demodulation of the downlink transmission transmitted directly to the demodulating UE and after the demodulation of an indirect downlink transmission transmitted to another UE of the set of UEs and received by the demodulating UE.

A one hundred-ninth aspect, based on the one hundred eighth aspect, wherein the downlink transmission scheme includes one or more of: a SU-MIMO scheme; a SDM scheme; a NCJT scheme; a TDM scheme; or a FDM scheme.

A one hundred-tenth aspect, based on the one hundred ninth aspect, wherein the downlink transmission scheme is determined to be the SU-MIMO scheme, and wherein the each cooperative transmission transmitted according to the SU-MIMO scheme carries a same set of one or more transport blocks and includes a same set of layers transmitted on a same beam.

A one hundred-eleventh aspect, based on the one hundred-tenth aspect, wherein the DCI message indicates one of: a single TCI state or a number of TCI states corresponding to a number of UEs of the set of UEs.

A one hundred-twelfth aspect, based on the one hundred-ninth aspect, wherein the downlink transmission scheme is determined to be one of: the SDM scheme, the NCJT scheme, the TDM scheme, or the FDM scheme, wherein the each cooperative transmission transmitted according to the downlink transmission scheme carries a different set of coded symbols on a different set of resources transmitted on a different.

A one hundred-thirteenth aspect, based on the one hundred-twelfth aspect, wherein the different set of coded symbols correspond to a same transport block, wherein the same transport block includes one of: a single redundancy value associated with joint rate matching, or a plurality of redundancy values wherein each redundancy value of the plurality of redundancy values is associated with a separate rate matching.

A one hundred-fourteenth aspect, based on the one hundred-twelfth aspect, wherein the downlink transmission scheme is determined to be one of: the SDM scheme or the NCJT scheme, wherein the different set of coded symbols each correspond to a different transport block.

A one hundred-fifteenth aspect, based on the one hundred-fourteenth aspect, wherein, when the set of UEs use the first LLR type, a number of layers of each set of transmission layers for each receiving UE of the set of UEs is no greater than a maximum number of layers supported for processing between the each receiving UE of the set of UEs to which the each cooperative transmission is transmitted, and when the set of UEs use the second LLR type, a sum of the number of layers of each set of transmission layers for each receiving UE of the set of UEs is no greater than a minimum number of layers supported for processing between the each receiving UE of the set of UEs.

A one hundred-sixteenth aspect, based on the one hundred-twelfth aspect, wherein the downlink transmission scheme is determined to be one of: the TDM scheme or the FDM scheme, when the set of UEs use the first LLR type, a number of layers of each set of transmission layers for each receiving UE of the set of UEs is no greater than a maximum number of layers supported for processing between the each receiving UE of the set of UEs to which the each cooperative transmission is transmitted, and when the set of UEs use the second LLR type, a maximum number of layers of each set of transmission layers for each receiving UE of the set of UEs is no greater than a minimum number of layers supported for processing between the each receiving UE of the set of UEs.

A one hundred-seventeenth aspect, based on the one hundred-twelfth aspect, wherein the DCI message indicates a plurality of TCI states.

A one hundred-eighteenth aspect includes any combination of the one hundred-fifth aspect through the one hundred-seventeenth aspect.

A one hundred-nineteenth aspect configured for wireless communication includes a non-transitory computer-readable medium having program code recorded thereon, the program code may include program code executable by a computer for causing the computer to establish, by a UE, a cooperative UE unit with one or more neighboring UEs, wherein the UE operates as the primary UE of the cooperative UE unit; program code executable by the computer for causing the computer to determine, by the UE, a downlink transmission scheme for cooperative transmissions from a serving base station; program code executable by the computer for causing the computer to receive, by the UE, a transmission of one or more transport blocks from the serving base station according to the downlink transmission scheme; program code executable by the computer for causing the computer to receive, by the UE, cooperative process data from the one or more neighboring UEs, wherein the cooperative process data is based on a neighboring transmission of the one or more transport blocks by the serving base station as received by the one or more neighboring UEs; and program code executable by the computer for causing the computer to process, by the UE, the transmission and the cooperative process data to decode the one or more transport blocks.

A one hundred-twentieth aspect, based on the one hundred-nineteenth aspect, wherein the cooperative process data includes one of: a pre-demodulated received transmission corresponding to the neighboring transmission; or a set of neighboring LLRs resulting from demodulation of the neighboring transmission by the one or more neighboring UEs.

A one hundred-twenty-first aspect, based on the one hundred-twentieth aspect, wherein the program code executable by the computer for causing the computer to process includes one of: program code executable by the computer for causing the computer to jointly demodulate the transmission and the pre-demodulated received transmission into a jointly demodulated transmission and program code executable by the computer for causing the computer to decode the jointly demodulated transmission to decode the one or more transport blocks; or program code executable by the computer for causing the computer to jointly decode the transmission to decode the one or more transport blocks using the set of neighboring LLRs and a set of LLRs resulting from the UE demodulation of the transmission.

A one hundred-twenty-second aspect, based on the one hundred-twenty-first aspect, wherein the set of neighboring LLRs and the set of LLRs correspond to one of: a first LLR type and a second LLR type, wherein the first LLR type includes a set of direct LLRs calculated from coded bits after demodulation of a downlink transmission transmitted directly to a demodulating UE, and wherein the second LLR type includes a set of combined LLRs calculated from the coded bits after the demodulation of the downlink transmission transmitted directly to the demodulating UE and after the demodulation of an indirect downlink transmission transmitted to one or more UEs neighboring the demodulating UE and received by the demodulating UE.

A one hundred-twenty-third aspect, based on the one hundred-twenty-second aspect, further including: program code executable by the computer for causing the computer to signal, by the UE, a cooperative UE capability report to the serving base station, wherein the cooperative UE capability report includes one or more of: a cooperative UE capability of the UE; a maximum number of layers supported for processing by the UE; a maximum number of combined layers supported for processing by the UE and the one or more neighboring UEs; a joint demodulation capability of the UE for the transmission and the pre-demodulated received transmission; a first LLR type capability of the UE; and a second LLR type capability of the UE.

A one hundred-twenty-fourth aspect, based on the one hundred-twenty-third aspect, further including: program code executable by the computer for causing the computer to receive, by the UE, in response to the cooperative UE capability report includes at least the joint demodulation capability, the first LLR type capability, and the second LLR type capability, a cooperative UE configuration signal from the serving base station, wherein the cooperative UE configuration signal includes a processing configuration identifying one of: the joint demodulation capability, the first LLR type capability, or the second LLR type capability.

A one hundred-twenty-fifth aspect, based on the one hundred-twenty-second aspect, wherein the downlink transmission scheme includes one or more of: a SU-MIMO scheme; a SDM scheme; a NCJT scheme; a TDM scheme; or a FDM scheme.

A one hundred-twenty-sixth aspect, based on the one hundred-twenty-fifth aspect, wherein the downlink transmission scheme is determined to be the SU-MIMO scheme, and wherein the transmission and the neighboring transmission each carry the one or more transport blocks and include a same set of layers transmitted on a same beam from the serving base station.

A one hundred-twenty-seventh aspect, based on the one hundred-twenty-sixth aspect, further including: program code executable by the computer for causing the computer to receive, by the UE, a DCI message scheduling the transmission, wherein the DCI message indicates one of: a single TCI state or a number of TCI states corresponding to a number of UEs of the cooperative UE unit; program code executable by the computer for causing the computer to determine, by the UE, a set of channel parameters corresponding to a set of receive antennas at the UE, wherein the set of channel parameters is determined using a reference signal associated with a TCI state indicated in the DCI message; and program code executable by the computer for causing the computer to determine, by the UE, a channel estimate for the set of receive antennas receiving the transmission, wherein the channel estimated is determined using the set of channel parameters.

A one hundred-twenty-eighth aspect, based on the one hundred-twenty-sixth aspect, wherein the program code executable by the computer for causing the computer to process includes the program code executable by the computer for causing the computer to jointly demodulate the transmission and the pre-demodulated received transmission and the program code executable by the computer for causing the computer to decode the jointly demodulated transmission.

A one hundred-twenty-ninth aspect, based on the one hundred-twenty-sixth aspect, wherein the program code executable by the computer for causing the computer to process includes the program code executable by the computer for causing the computer to jointly decode the transmission using the set of neighboring LLRs and the set of LLRs, wherein the set of neighboring LLRs and the set of LLRs are a first LLR type, wherein a number of the same set of layers is no greater than a minimum number of layers supported for processing incoming transmissions between the UE and the one or more neighboring UEs of the cooperative UE unit.

A one hundred-thirtieth aspect, based on the one hundred-twenty-fifth aspect, wherein the downlink transmission scheme is determined to be one of: the SDM scheme, the NCJT scheme, the TDM scheme, or the FDM scheme, wherein the transmission carries a first set of coded symbols on a first set of resources transmitted on a first beam from the serving base station and the neighboring transmission carries a different set of coded symbols on a different set of resources transmitted on a different beam from the serving base station.

A one hundred-thirty-first aspect, based on the one hundred-thirtieth aspect, wherein the first set of coded symbols and the different set of coded symbols correspond to a same transport block, wherein the same transport block includes one of: a single redundancy value associated with joint rate matching, or a plurality of redundancy values wherein each redundancy value of the plurality of redundancy values is associated with a separate rate matching.

A one hundred-thirty-second aspect, based on the one hundred-thirtieth aspect, wherein the downlink transmission scheme is determined to be one of: the SDM scheme or the NCJT scheme, wherein the first set of coded symbols and the different set of coded symbols correspond to a different transport block.

A one hundred-thirty-third aspect, based on the one hundred-thirtieth aspect, wherein the program code executable by the computer for causing the computer to process includes the program code executable by the computer for causing the computer to jointly demodulate the transmission and the pre-demodulated received transmission and the program code executable by the computer for causing the computer to decode the jointly demodulated transmission, wherein the transmission includes a first transmission component corresponding to a direct transmission from the serving base station to the UE and a second transmission component corresponding to an indirect transmission from the serving base station to the one or more neighboring UEs received by the UE, and the pre-modulated received transmission includes a first neighboring component corresponding to a direct neighboring transmission from the serving base station to the one or more neighboring UEs and a second neighboring component corresponding to an indirect neighboring transmission of the transmission from the serving base station to the UE received by the one or more neighboring UEs.

A one hundred-thirty-fourth aspect, based on the one hundred-thirtieth aspect, wherein the program code executable by the computer for causing the computer to process includes the program code executable by the computer for causing the computer to jointly decode the transmission using the set of neighboring LLRs and the set of LLRs, wherein the set of neighboring LLRs and the set of LLRs are one of a first LLR type or a second LLR type.

A one hundred-thirty-fifth aspect, based on the one hundred-thirty-fourth aspect, wherein the downlink transmission scheme is determined to be one of: the SDM scheme or the NCJT scheme, when the set of neighboring LLRs and the set of LLRs are the first LLR type, a number of a first set of layers for the transmission is no greater than a maximum number of layers supported for processing by the UE and a number of a different set of layers for the neighboring transmission is no greater than a maximum number of neighboring layers supported for processing by a receiving neighboring UE of the one or more neighboring UEs, and when the set of neighboring LLRs and the set of LLRs are the second LLR type, a sum of the first set of layers for the transmission and the different set of layers for the neighboring transmission is no greater than a minimum number of layers between the maximum number of layers supported for processing by the UE and the maximum number of neighboring layers supported for processing by the one or more neighboring UEs.

A one hundred-thirty-sixth aspect, based on the one hundred-thirty-fourth aspect, wherein the downlink transmission scheme is determined to be one of: the TDM scheme or the FDM scheme, when the set of neighboring LLRs and the set of LLRs are the first LLR type, a number of a first set of layers for the transmission is no greater than a maximum number of layers supported for processing by the UE and a number of a different set of layers for the neighboring transmission is no greater than a maximum number of neighboring layers supported for processing by a receiving neighbor UE of the one or more neighboring UEs, and when the set of neighboring LLRs and the set of LLRs are the second LLR type, a maximum number of layers between the first set of layers of the transmission and the different set of layers of the neighboring transmission is no greater than a minimum number of layers between the maximum number of layers supported for processing by the UE and the maximum number of neighboring layers supported for processing by the one or more neighboring UEs.

A one hundred-thirty-seventh aspect, based on the one hundred-thirty-fifth aspect, further including: program code executable by the computer for causing the computer to receive, by the UE, a DCI message scheduling the transmission, wherein the DCI message indicates a plurality of TCI states; program code executable by the computer for causing the computer to determine, by the UE, a set of channel parameters using at least one reference signal associated with at least one TCI state of the plurality of TCI states indicated in the DCI message; and program code executable by the computer for causing the computer to determine, by the UE, a channel estimate using the set of channel parameters.

A one hundred-thirty-eighth aspect, based on the one hundred-thirty-seventh aspect, wherein the set of channel parameters is determined for a set of receive antennas at the UE, and wherein the channel estimate is determined for the set of receive antennas receiving the transmission.

A one hundred-thirty-ninth aspect, based on the one hundred-thirty-seventh aspect, wherein the set of LLRs and the set of neighboring LLRs includes the second LLR type, wherein the set of channel parameters is determined for a set of receive antennas at the UE and the first beam, and wherein the channel estimate is determined for the set of receive antennas and the first set of resources.

A one hundred-fortieth aspect, based on the one hundred-thirty-ninth aspect, wherein the set of channel parameters is determined from at least one reference signal linked to one of: the at least one TCI state corresponding to the first set of resources; or the at least one TCI state corresponding to the first set of resources and a set of receive antennas at the UE.

A one hundred-forty-first aspect includes any combination of the one hundred-nineteenth aspect through the one hundred-fortieth aspect.

A one hundred-forty-second aspect configured for wireless communication includes a non-transitory computer-readable medium having program code recorded thereon, the program code comprising: program code executable by a computer for causing the computer to cooperate, by a UE, with a primary UE to form a cooperative UE unit; program code executable by the computer for causing the computer to determine, by the UE, a downlink transmission scheme for cooperative transmissions from a serving base station; program code executable by the computer for causing the computer to receive, by the UE, a cooperative transmission of one or more transport blocks from the serving base station according to the downlink transmission scheme; program code executable by the computer for causing the computer to generate, by the UE, cooperative process data from the cooperative transmission; and program code executable by the computer for causing the computer to transmit, by the UE, the cooperative process data to the primary UE.

A one hundred-forty-third aspect, based on the one hundred-forty-second aspect, wherein the program code executable by the computer for causing the computer to generate the cooperative process data includes one of: program code executable by the computer for causing the computer to generate a pre-demodulated received transmission corresponding to the received cooperative transmission prior to demodulation; or program code executable by the computer for causing the computer to demodulate the cooperative transmission and calculating a set of cooperative LLRs from coded bits of the demodulated cooperative transmission.

A one hundred-forty-fourth aspect, based on the one hundred-forty-third aspect, wherein the set of cooperative LLRs correspond to one of: a first LLR type and a second LLR type, wherein the first LLR type includes a set of direct LLRs calculated after demodulation of the cooperative transmission transmitted directly to the UE, and wherein the second LLR type includes a set of combined LLRs calculated after the demodulation of the cooperative transmission transmitted directly to the UE and after the demodulation of a primary transmission transmitted to the primary UE and received by the UE.

A one hundred-forty-fifth aspect, based on the one hundred-forty-fourth aspect, further including: program code executable by the computer for causing the computer to signal, by the UE, a cooperative UE capability report to the serving base station, wherein the cooperative UE capability report includes one or more of: a cooperative UE capability of the UE; a maximum number of layers supported for processing by the UE; a maximum number of combined layers supported for processing by the UE and the one or more neighboring UEs; a joint demodulation capability of the UE for the cooperative transmission and the pre-demodulated received transmission; a first LLR type capability of the UE; and a second LLR type capability of the UE.

A one hundred-forty-sixth aspect, based on the one hundred-forty-fifth aspect, further including: program code executable by the computer for causing the computer to receive, by the UE, in response to the cooperative UE capability report includes at least the joint demodulation capability, the first LLR type capability, and the second LLR type capability, a cooperative UE configuration signal from the serving base station, wherein the cooperative UE configuration signal includes a processing configuration identifying one of: the joint demodulation capability, the first LLR type capability, or the second LLR type capability.

A one hundred-forty-seventh aspect, based on the one hundred-forty-fourth aspect, wherein the downlink transmission scheme includes one or more of: a SU-MIMO scheme; a SDM scheme; a NCJT scheme; a TDM scheme; or a FDM scheme.

A one hundred-forty-eighth aspect, based on the one hundred-forty-seventh aspect, wherein the downlink transmission scheme is determined to be the SU-MIMO scheme, and wherein the cooperative transmission and a primary transmission from the serving base station to the primary UE each carry the one or more transport blocks and include a same set of layers transmitted on a same beam from the serving base station.

A one hundred-forty-ninth aspect, based on the one hundred-forty-eighth aspect, further including: program code executable by the computer for causing the computer to receive, by the UE, a DCI message scheduling the cooperative transmission, wherein the DCI message indicates one of: a single TCI state or a number of TCI states corresponding to a number of UEs of the cooperative UE unit; program code executable by the computer for causing the computer to determine, by the UE, a set of channel parameters corresponding to a set of receive antennas at the UE, wherein the set of channel parameters is determined using a reference signal associated with a TCI state indicated in the DCI message; and program code executable by the computer for causing the computer to determine, by the UE, a channel estimate for the set of receive antennas receiving the cooperative transmission, wherein the channel estimated is determined using the set of channel parameters.

A one hundred-fiftieth aspect, based on the one hundred-forty-eighth aspect, wherein the program code executable by the computer for causing the computer to generate the cooperative process data includes the program code executable by the computer for causing the computer to generate the pre-demodulated received transmission corresponding to the received cooperative transmission prior to the demodulation.

A one hundred-fifty-first aspect, based on the one hundred-forty-eighth aspect, wherein the program code executable by the computer for causing the computer to generate the cooperative process data includes the program code executable by the computer for causing the computer to demodulate the cooperative transmission and the program code executable by the computer for causing the computer to calculate the set of cooperative LLRs, wherein the set of cooperative LLRs is a first LLR type, wherein a number of the same set of layers corresponds to a minimum number of layers supported for processing incoming transmissions between the UE and the primary UE.

A one hundred-fifty-second aspect, based on the one hundred-forty-seventh aspect, wherein the downlink transmission scheme is determined to be one of: the SDM scheme, the NCJT scheme, the TDM scheme, or the FDM scheme, wherein the cooperative transmission carries a first set of coded symbols on a first set of resources transmitted on a first beam from the serving base station and the primary transmission carries a different set of coded symbols on a different set of resources transmitted on a different beam from the serving base station.

A one hundred-fifty-third aspect, based on the one hundred-fifty-second aspect, wherein the first set of coded symbols and the different set of coded symbols correspond to a same transport block, wherein the same transport block includes one of: a single redundancy value associated with joint rate matching, or a plurality of redundancy values wherein each redundancy value of the plurality of redundancy values is associated with a separate rate matching.

A one hundred-fifty-fourth aspect, based on the one hundred-fifty-second aspect, wherein the downlink transmission scheme is determined to be one of: the SDM scheme or the NCJT scheme, wherein the first set of coded symbols and the different set of coded symbols correspond to a different transport block.

A one hundred-fifty-fifth aspect, based on the one hundred-fifty-second aspect, wherein the program code executable by the computer for causing the computer to generate the cooperative process data includes the program code executable by the computer for causing the computer to generate the pre-demodulated received transmission corresponding to the received cooperative transmission prior to the demodulation, wherein the pre-demodulated received transmission includes a first component corresponding to the cooperative transmission from the serving base station to the UE and a second transmission component corresponding to a primary transmission from the serving base station to the primary UE received by the UE.

A one hundred-fifty-sixth aspect, based on the one hundred-fifty-second aspect, wherein the program code executable by the computer for causing the computer to generate the cooperative process data includes the program code executable by the computer for causing the computer to demodulate the cooperative transmission and the program code executable by the computer for causing the computer to calculate the set of cooperative LLRs, wherein the set of cooperative LLRs corresponds to one of: a first LLR type or a second LLR type.

A one hundred-fifty-seventh aspect, based on the one hundred-fifty-sixth aspect, wherein the downlink transmission scheme is determined to be one of: the SDM scheme or the NCJT scheme, when the set of cooperative LLRs corresponds to the first LLR type, a number of a first set of layers for the cooperative transmission is no greater than a maximum number of layers supported for processing by the UE and a number of a first set of primary layers for the primary transmission is no greater than a maximum number of layers supported for processing by the primary UE, and when the set of cooperative LLRs corresponds to the second LLR type, a sum of the first set of layers and a primary set of layers for the primary transmission is no greater than a minimum number of layers between a maximum number of layers supported for processing by the UE and a maximum number of primary layers supported for processing by the primary UE.

A one hundred-fifty-eighth aspect, based on the one hundred-fifty-sixth aspect, wherein the downlink transmission scheme is determined to be one of: the TDM scheme or the FDM scheme, when the set of cooperative LLRs correspond to the first LLR type, a number of a first set of layers for the cooperative transmission is no greater than a maximum number of layers supported for processing by the UE and a number of a first set of primary layers for the primary transmission is no greater than a maximum number of layers supported for processing by the primary UE, and when the set of cooperative LLRs correspond to the second LLR type, a maximum number of layers supported by processing between the UE and the primary UE is not greater than a minimum number of layers between a maximum number of layers supported for processing by the UE and a maximum number of primary layers supported for processing by the primary UE.

A one hundred-fifty-ninth aspect, based on the one hundred-fifty-second aspect, further including: program code executable by the computer for causing the computer to receive, by the UE, a DCI message scheduling the cooperative transmission, wherein the DCI message indicates a plurality of TCI states; program code executable by the computer for causing the computer to determine, by the UE, a set of channel parameters using at least one reference signal associated with at least one TCI state of the plurality of TCI states indicated in the DCI message; and program code executable by the computer for causing the computer to determine, by the UE, a channel estimate using the set of channel parameters.

A one hundred-sixtieth aspect, based on the one hundred-fifty-ninth aspect, wherein the set of channel parameters is determined for a set of receive antennas at the UE, and wherein the channel estimate is determined for the set of receive antennas receiving the cooperative transmission.

A one hundred-sixty-first aspect, based on the one hundred-fifty-ninth aspect, wherein the set of channel parameters is determined for a set of receive antennas at the UE and the first beam, and wherein the channel estimate is determined for the set of receive antennas and the first set of resources.

A one hundred-sixty-second aspect, based on the one hundred-sixty-first aspect, wherein the set of channel parameters is determined from at least one reference signal linked to one of: the at least one TCI state corresponding to the first set of resources; or the at least one TCI state corresponding to the first set of resources and a set of receive antennas at the UE.

A one hundred-sixty-third aspect includes any combination of the one hundred-forty-second aspect through the one hundred-sixty-second aspect.

A one hundred-sixty-fourth aspect configured for wireless communication includes a non-transitory computer-readable medium having program code recorded thereon, the program code may include program code executable by a computer for causing the computer to receive, at a base station, a cooperative UE capability report from a plurality of served UEs, wherein the cooperative UE capability report includes UE capabilities and at least an indication of a cooperative UE unit formed by a set of UEs of the plurality of served UEs; program code executable by the computer for causing the computer to schedule, by the base station, transmission of a set of cooperative transmissions according to the UE capabilities of the cooperative UE unit, wherein the set of cooperative transmissions includes a cooperative transmission for each UE of the set of UEs; program code executable by the computer for causing the computer to signal, by the base station, a DCI to the set of UEs, wherein the DCI identifies a schedule of the set of cooperative transmissions and a downlink transmission scheme for the transmission of each cooperative transmission of the set of cooperative transmissions; and program code executable by the computer for causing the computer to transmit, by the base station, each cooperative transmission of the set of cooperative transmissions according to the UE capabilities at the downlink transmission scheme to a corresponding UE of the set of UEs of the cooperative UE unit.

A one hundred-sixty-fifth aspect, based on the one hundred-sixty-fourth aspect, wherein the UE capabilities reported in the cooperative UE capability report includes one or more of: a cooperative UE capability of the UE; a maximum number of layers supported for processing by the UE; a maximum number of combined layers supported for processing by the UE and the one or more neighboring UEs; a joint demodulation capability of the UE for two or more cooperative transmissions of the set of cooperative transmissions; a first LLR type capability of the UE; and a second LLR type capability of the UE.

A one hundred-sixty-sixth aspect, based on the one hundred-sixty-fifth aspect, further including: program code executable by the computer for causing the computer to transmit, by the base station, in response to the cooperative UE capability report including at least the joint demodulation capability, the first LLR type capability, and the second LLR type capability, a cooperative UE configuration signal to each UE of the set of UE from which the cooperative UE capability report is received including the at least the joint demodulation capability, the first LLR type capability, and the second LLR type capability, wherein the cooperative UE configuration signal includes a processing configuration identifying one of: the joint demodulation capability, the first LLR type capability, or the second LLR type capability.

A one hundred-sixty-seventh aspect, based on the one hundred-sixty-sixth aspect, wherein the first LLR type capability includes a capability for generation of a set of direct LLRs calculated from coded bits after demodulation of a downlink transmission transmitted directly to a demodulating UE, and wherein the second LLR type capability includes a capability for generation of a set of combined LLRs calculated from the coded bits after the demodulation of the downlink transmission transmitted directly to the demodulating UE and after the demodulation of an indirect downlink transmission transmitted to another UE of the set of UEs and received by the demodulating UE.

A one hundred-sixty-eighth aspect, based on the one hundred-sixty-seventh aspect, wherein the downlink transmission scheme includes one or more of: a SU-MIMO scheme; a SDM scheme; a NCJT scheme; a TDM scheme; or a FDM scheme.

A one hundred-sixty-ninth aspect, based on the one hundred-sixty-eighth aspect, wherein the downlink transmission scheme is determined to be the SU-MIMO scheme, and wherein the each cooperative transmission transmitted according to the SU-MIMO scheme carries a same set of one or more transport blocks and includes a same set of layers transmitted on a same beam.

A one hundred-seventieth aspect, based on the one hundred-sixty-ninth aspect, wherein the DCI message indicates one of: a single TCI state or a number of TCI states corresponding to a number of UEs of the set of UEs.

A one hundred-seventy-first aspect, based on the one hundred-sixty-eighth aspect, wherein the downlink transmission scheme is determined to be one of: the SDM scheme, the NCJT scheme, the TDM scheme, or the FDM scheme, wherein the each cooperative transmission transmitted according to the downlink transmission scheme carries a different set of coded symbols on a different set of resources transmitted on a different.

A one hundred-seventy-second aspect, based on the one hundred-seventy-first aspect, wherein the different set of coded symbols correspond to a same transport block, wherein the same transport block includes one of: a single redundancy value associated with joint rate matching, or a plurality of redundancy values wherein each redundancy value of the plurality of redundancy values is associated with a separate rate matching.

A one hundred-seventy-third aspect, based on the one hundred-seventy-first aspect, wherein the downlink transmission scheme is determined to be one of: the SDM scheme or the NCJT scheme, wherein the different set of coded symbols each correspond to a different transport block.

A one hundred-seventy-fourth aspect, based on the one hundred-seventy-third aspect, wherein, when the set of UEs use the first LLR type, a number of layers of each set of transmission layers for each receiving UE of the set of UEs is no greater than a maximum number of layers supported for processing between the each receiving UE of the set of UEs to which the each cooperative transmission is transmitted, and when the set of UEs use the second LLR type, a sum of the number of layers of each set of transmission layers for each receiving UE of the set of UEs is no greater than a minimum number of layers supported for processing between the each receiving UE of the set of UEs.

A one hundred-seventy-fifth aspect, based on the one hundred-seventy-first aspect, wherein the downlink transmission scheme is determined to be one of: the TDM scheme or the FDM scheme, when the set of UEs use the first LLR type, a number of layers of each set of transmission layers for each receiving UE of the set of UEs is no greater than a maximum number of layers supported for processing between the each receiving UE of the set of UEs to which the each cooperative transmission is transmitted, and when the set of UEs use the second LLR type, a maximum number of layers of each set of transmission layers for each receiving UE of the set of UEs is no greater than a minimum number of layers supported for processing between the each receiving UE of the set of UEs.

A one hundred-seventy-sixth aspect, based on the one hundred-seventy-first aspect, wherein the DCI message indicates a plurality of TCI states.

A one hundred-seventy-seventh aspect includes any combination of the one hundred-sixty-fourth aspect through the one hundred-seventy-sixty aspect.

A one hundred-seventy-eighth aspect configured for wireless communication may include at least one processor; and a memory coupled to the at least one processor, wherein the at least one processor is configured to establish, by a UE, a cooperative UE unit with one or more neighboring UEs, wherein the UE operates as the primary UE of the cooperative UE unit; to determine, by the UE, a downlink transmission scheme for cooperative transmissions from a serving base station; to receive, by the UE, a transmission of one or more transport blocks from the serving base station according to the downlink transmission scheme; to receive, by the UE, cooperative process data from the one or more neighboring UEs, wherein the cooperative process data is based on a neighboring transmission of the one or more transport blocks by the serving base station as received by the one or more neighboring UEs; and to process, by the UE, the transmission and the cooperative process data to decode the one or more transport blocks.

A one hundred seventy-ninth aspect, based on the one hundred-seventy-eighth aspect, wherein the cooperative process data includes one of: a pre-demodulated received transmission corresponding to the neighboring transmission; or a set of neighboring LLRs resulting from demodulation of the neighboring transmission by the one or more neighboring UEs.

A one hundred-eightieth aspect, based on the one hundred-seventy-ninth aspect, wherein the configuration of the at least one processor to process includes configuration of the at least one processor to one of: jointly demodulate the transmission and the pre-demodulated received transmission into a jointly demodulated transmission and to decode the jointly demodulated transmission to decode the one or more transport blocks; or to jointly decode the transmission to decode the one or more transport blocks using the set of neighboring LLRs and a set of LLRs resulting from the UE demodulation of the transmission.

A one hundred-eighty-first aspect, based on the one hundred-eightieth aspect, wherein the set of neighboring LLRs and the set of LLRs correspond to one of: a first LLR type and a second LLR type, wherein the first LLR type includes a set of direct LLRs calculated from coded bits after demodulation of a downlink transmission transmitted directly to a demodulating UE, and wherein the second LLR type includes a set of combined LLRs calculated from the coded bits after the demodulation of the downlink transmission transmitted directly to the demodulating UE and after the demodulation of an indirect downlink transmission transmitted to one or more UEs neighboring the demodulating UE and received by the demodulating UE.

A one hundred-eighty-second aspect, based on the one hundred-eighty-first aspect, further including configuration of the at least one processor: to signal, by the UE, a cooperative UE capability report to the serving base station, wherein the cooperative UE capability report includes one or more of: a cooperative UE capability of the UE; a maximum number of layers supported for processing by the UE; a maximum number of combined layers supported for processing by the UE and the one or more neighboring UEs; a joint demodulation capability of the UE for the transmission and the pre-demodulated received transmission; a first LLR type capability of the UE; and a second LLR type capability of the UE.

A one hundred-eighty-third aspect, based on the one hundred-eighty-second aspect, further including configuration of the at least one processor to receive, by the UE, in response to the cooperative UE capability report includes at least the joint demodulation capability, the first LLR type capability, and the second LLR type capability, a cooperative UE configuration signal from the serving base station, wherein the cooperative UE configuration signal includes a processing configuration identifying one of: the joint demodulation capability, the first LLR type capability, or the second LLR type capability.

A one hundred-eighty-fourth aspect, based on the one hundred-eighty-first aspect, wherein the downlink transmission scheme includes one or more of: a SU-MIMO scheme; a SDM scheme; a NCJT scheme; a TDM scheme; or a FDM scheme.

A one hundred-eighty-fifth aspect, based on the one hundred-eighty-fourth aspect, wherein the downlink transmission scheme is determined to be the SU-MIMO scheme, and wherein the transmission and the neighboring transmission each carry the one or more transport blocks and include a same set of layers transmitted on a same beam from the serving base station.

A one hundred-eighty-sixth aspect, based on the one hundred-eighty-fifth aspect, further including configuration of the at least one processor: to receive, by the UE, a DCI message scheduling the transmission, wherein the DCI message indicates one of: a single TCI state or a number of TCI states corresponding to a number of UEs of the cooperative UE unit; to determine, by the UE, a set of channel parameters corresponding to a set of receive antennas at the UE, wherein the set of channel parameters is determined using a reference signal associated with a TCI state indicated in the DCI message; and to determine, by the UE, a channel estimate for the set of receive antennas receiving the transmission, wherein the channel estimated is determined using the set of channel parameters.

A one hundred-eighty-seventh aspect, based on the one hundred-eighty-fifth aspect, wherein the configuration of the at least one processor to process includes the configuration of the at least one processor to jointly demodulate the transmission and the pre-demodulated received transmission and the configuration of the at least one processor to decode the jointly demodulated transmission.

A one hundred-eighty-eighth aspect, based on the one hundred-eighty-fifth aspect, wherein the configuration of the at least one processor to process includes the configuration of the at least one processor to jointly decode the transmission using the set of neighboring LLRs and the set of LLRs, wherein the set of neighboring LLRs and the set of LLRs are a first LLR type, and wherein a number of the same set of layers is no greater than a minimum number of layers supported for processing incoming transmissions between the UE and the one or more neighboring UEs of the cooperative UE unit.

A one hundred-eighty-ninth aspect, based on the one hundred-eighty-fourth aspect, wherein the downlink transmission scheme is determined to be one of: the SDM scheme, the NCJT scheme, the TDM scheme, or the FDM scheme, and wherein the transmission carries a first set of coded symbols on a first set of resources transmitted on a first beam from the serving base station and the neighboring transmission carries a different set of coded symbols on a different set of resources transmitted on a different beam from the serving base station.

A one hundred-ninetieth aspect, based on the one hundred-eighty-ninth aspect, wherein the first set of coded symbols and the different set of coded symbols correspond to a same transport block, wherein the same transport block includes one of: a single redundancy value associated with joint rate matching, or a plurality of redundancy values wherein each redundancy value of the plurality of redundancy values is associated with a separate rate matching.

A one hundred-ninety-first aspect, based on the one hundred-eighty-ninth aspect, wherein the downlink transmission scheme is determined to be one of: the SDM scheme or the NCJT scheme, and wherein the first set of coded symbols and the different set of coded symbols correspond to a different transport block.

A one hundred-ninety-second aspect, based on the one hundred-eighty-ninth aspect, wherein the configuration of the at least one processor to process includes the configuration of the at least one processor to jointly demodulate the transmission and the pre-demodulated received transmission and the configuration of the at least one processor to decode the jointly demodulated transmission, wherein the transmission includes a first transmission component corresponding to a direct transmission from the serving base station to the UE and a second transmission component corresponding to an indirect transmission from the serving base station to the one or more neighboring UEs received by the UE, and the pre-modulated received transmission includes a first neighboring component corresponding to a direct neighboring transmission from the serving base station to the one or more neighboring UEs and a second neighboring component corresponding to an indirect neighboring transmission of the transmission from the serving base station to the UE received by the one or more neighboring UEs.

A one hundred-ninety-third aspect, based on the one hundred-eighty-ninth aspect, wherein the configuration of the at least one processor to process includes the configuration of the at least one processor to jointly decode the transmission using the set of neighboring LLRs and the set of LLRs, wherein the set of neighboring LLRs and the set of LLRs are one of a first LLR type or a second LLR type.

A one hundred-ninety-fourth aspect, based on the one hundred-ninety-third aspect, wherein the downlink transmission scheme is determined to be one of: the SDM scheme or the NCJT scheme, when the set of neighboring LLRs and the set of LLRs are the first LLR type, a number of a first set of layers for the transmission is no greater than a maximum number of layers supported for processing by the UE and a number of a different set of layers for the neighboring transmission is no greater than a maximum number of neighboring layers supported for processing by a receiving neighboring UE of the one or more neighboring UEs, and when the set of neighboring LLRs and the set of LLRs are the second LLR type, a sum of the first set of layers for the transmission and the different set of layers for the neighboring transmission is no greater than a minimum number of layers between the maximum number of layers supported for processing by the UE and the maximum number of neighboring layers supported for processing by the one or more neighboring UEs.

A one hundred-ninety-fifth aspect, based on the one hundred-ninety-third aspect, wherein the downlink transmission scheme is determined to be one of: the TDM scheme or the FDM scheme, when the set of neighboring LLRs and the set of LLRs are the first LLR type, a number of a first set of layers for the transmission is no greater than a maximum number of layers supported for processing by the UE and a number of a different set of layers for the neighboring transmission is no greater than a maximum number of neighboring layers supported for processing by a receiving neighbor UE of the one or more neighboring UEs, and when the set of neighboring LLRs and the set of LLRs are the second LLR type, a maximum number of layers between the first set of layers of the transmission and the different set of layers of the neighboring transmission is no greater than a minimum number of layers between the maximum number of layers supported for processing by the UE and the maximum number of neighboring layers supported for processing by the one or more neighboring UEs.

A one hundred-ninety-sixth aspect, based on the one hundred-ninety-fourth aspect, further including configuration of the at least one processor: to receive, by the UE, a DCI message scheduling the transmission, wherein the DCI message indicates a plurality of TCI states; to determine, by the UE, a set of channel parameters using at least one reference signal associated with at least one TCI state of the plurality of TCI states indicated in the DCI message; and to determine, by the UE, a channel estimate using the set of channel parameters.

A one hundred-ninety-seventh aspect, based on the one hundred-ninety-sixth aspect, wherein the set of channel parameters is determined for a set of receive antennas at the UE, and wherein the channel estimate is determined for the set of receive antennas receiving the transmission.

A one hundred-ninety-eighth aspect, based on the one hundred-ninety-sixth aspect, wherein the set of LLRs and the set of neighboring LLRs includes the second LLR type, wherein the set of channel parameters is determined for a set of receive antennas at the UE and the first beam, and wherein the channel estimate is determined for the set of receive antennas and the first set of resources.

A one hundred-ninety-ninth aspect, based on the one hundred-ninety-eighth aspect, wherein the set of channel parameters is determined from at least one reference signal linked to one of: the at least one TCI state corresponding to the first set of resources; or the at least one TCI state corresponding to the first set of resources and a set of receive antennas at the UE.

A two hundredth aspect includes any combination of the one hundred-seventy-eighth aspect through the one hundred-ninety-ninth aspect.

A two hundred-first aspect configured for wireless communication may include at least one processor; and a memory coupled to the at least one processor, wherein the at least one processor is configured: to cooperate, by a UE, with a primary UE to form a cooperative UE unit; to determine, by the UE, a downlink transmission scheme for cooperative transmissions from a serving base station; to receive, by the UE, a cooperative transmission of one or more transport blocks from the serving base station according to the downlink transmission scheme; to generate, by the UE, cooperative process data from the cooperative transmission; and to transmit, by the UE, the cooperative process data to the primary UE.

A two hundred-second aspect, based on the two hundred-first aspect, wherein the program code executable by the computer for causing the computer to generate the cooperative process data includes configuration of the at least one processor to one of: generate a pre-demodulated received transmission corresponding to the received cooperative transmission prior to demodulation; or demodulate the cooperative transmission and calculating a set of cooperative LLRs from coded bits of the demodulated cooperative transmission.

A two hundred-third aspect, based on the two hundred-second aspect, wherein the set of cooperative LLRs correspond to one of: a first LLR type and a second LLR type, wherein the first LLR type includes a set of direct LLRs calculated after demodulation of the cooperative transmission transmitted directly to the UE, and wherein the second LLR type includes a set of combined LLRs calculated after the demodulation of the cooperative transmission transmitted directly to the UE and after the demodulation of a primary transmission transmitted to the primary UE and received by the UE.

A two hundred-fourth aspect, based on the two hundred-third aspect, further including configuration of the at least one processor: to signal, by the UE, a cooperative UE capability report to the serving base station, wherein the cooperative UE capability report includes one or more of: a cooperative UE capability of the UE; a maximum number of layers supported for processing by the UE; a maximum number of combined layers supported for processing by the UE and the one or more neighboring UEs; a joint demodulation capability of the UE for the cooperative transmission and the pre-demodulated received transmission; a first LLR type capability of the UE; and a second LLR type capability of the UE.

A two hundred-fifth aspect, based on the two hundred-fourth aspect, further including configuration of the at least one processor to receive, by the UE, in response to the cooperative UE capability report includes at least the joint demodulation capability, the first LLR type capability, and the second LLR type capability, a cooperative UE configuration signal from the serving base station, wherein the cooperative UE configuration signal includes a processing configuration identifying one of: the joint demodulation capability, the first LLR type capability, or the second LLR type capability.

A two hundred-sixth aspect, based on the two hundred-third aspect, wherein the downlink transmission scheme includes one or more of: a SU-MIMO scheme; a SDM scheme; a NCJT scheme; a TDM scheme; or a FDM scheme.

A two hundred-seventh aspect, based on the two hundred-sixth aspect, wherein the downlink transmission scheme is determined to be the SU-MIMO scheme, and wherein the cooperative transmission and a primary transmission from the serving base station to the primary UE each carry the one or more transport blocks and include a same set of layers transmitted on a same beam from the serving base station.

A two hundred-eighth aspect, based on the two hundred-seventh aspect, further including configuration of the at least one processor: to receive, by the UE, a DCI message scheduling the cooperative transmission, wherein the DCI message indicates one of: a single TCI state or a number of TCI states corresponding to a number of UEs of the cooperative UE unit; to determine, by the UE, a set of channel parameters corresponding to a set of receive antennas at the UE, wherein the set of channel parameters is determined using a reference signal associated with a TCI state indicated in the DCI message; and to determine, by the UE, a channel estimate for the set of receive antennas receiving the cooperative transmission, wherein the channel estimated is determined using the set of channel parameters.

A two hundred-ninth aspect, based on the two hundred-seventh aspect, wherein configuration of the at least one processor to generate the cooperative process data includes the configuration of the at least one processor to generate the pre-demodulated received transmission corresponding to the received cooperative transmission prior to the demodulation.

A two hundred-tenth aspect, based on the two hundred-seventh aspect, wherein the configuration of the at least one processor to generate the cooperative process data includes the configuration of the at least one processor to demodulate the cooperative transmission and the configuration of the at least one processor to calculate the set of cooperative LLRs, wherein the set of cooperative LLRs is a first LLR type, wherein a number of the same set of layers corresponds to a minimum number of layers supported for processing incoming transmissions between the UE and the primary UE.

A two hundred-eleventh aspect, based on the two hundred-sixth aspect, wherein the downlink transmission scheme is determined to be one of: the SDM scheme, the NCJT scheme, the TDM scheme, or the FDM scheme, wherein the cooperative transmission carries a first set of coded symbols on a first set of resources transmitted on a first beam from the serving base station and the primary transmission carries a different set of coded symbols on a different set of resources transmitted on a different beam from the serving base station.

A two hundred-twelfth aspect, based on the two hundred-eleventh aspect, wherein the first set of coded symbols and the different set of coded symbols correspond to a same transport block, wherein the same transport block includes one of: a single redundancy value associated with joint rate matching, or a plurality of redundancy values wherein each redundancy value of the plurality of redundancy values is associated with a separate rate matching.

A two hundred-thirteenth aspect, based on the two hundred-eleventh aspect, wherein the downlink transmission scheme is determined to be one of: the SDM scheme or the NCJT scheme, wherein the first set of coded symbols and the different set of coded symbols correspond to a different transport block.

A two hundred-fourteenth aspect, based on the two hundred-eleventh aspect, wherein the configuration of the at least one processor to generate the cooperative process data includes the configuration of the at least one processor to generate the pre-demodulated received transmission corresponding to the received cooperative transmission prior to the demodulation, wherein the pre-demodulated received transmission includes a first component corresponding to the cooperative transmission from the serving base station to the UE and a second transmission component corresponding to a primary transmission from the serving base station to the primary UE received by the UE.

A two hundred-fifteenth aspect, based on the two hundred-eleventh aspect, wherein the configuration of the at least one processor to generate the cooperative process data includes the configuration of the at least one processor to demodulate the cooperative transmission and the configuration of the at least one processor to calculate the set of cooperative LLRs, wherein the set of cooperative LLRs corresponds to one of: a first LLR type or a second LLR type.

A two hundred-sixteenth aspect, based on the two hundred-fifteenth aspect, wherein the downlink transmission scheme is determined to be one of: the SDM scheme or the NCJT scheme, when the set of cooperative LLRs corresponds to the first LLR type, a number of a first set of layers for the cooperative transmission is no greater than a maximum number of layers supported for processing by the UE and a number of a first set of primary layers for the primary transmission is no greater than a maximum number of layers supported for processing by the primary UE, and when the set of cooperative LLRs corresponds to the second LLR type, a sum of the first set of layers and a primary set of layers for the primary transmission is no greater than a minimum number of layers between a maximum number of layers supported for processing by the UE and a maximum number of primary layers supported for processing by the primary UE.

A two hundred-seventeenth aspect, based on the two hundred-fifteenth aspect, wherein the downlink transmission scheme is determined to be one of: the TDM scheme or the FDM scheme, when the set of cooperative LLRs correspond to the first LLR type, a number of a first set of layers for the cooperative transmission is no greater than a maximum number of layers supported for processing by the UE and a number of a first set of primary layers for the primary transmission is no greater than a maximum number of layers supported for processing by the primary UE, and when the set of cooperative LLRs correspond to the second LLR type, a maximum number of layers supported by processing between the UE and the primary UE is not greater than a minimum number of layers between a maximum number of layers supported for processing by the UE and a maximum number of primary layers supported for processing by the primary UE.

A two hundred-eighteenth aspect, based on the two hundred-eleventh aspect, further including configuration of the at least one processor: to receive, by the UE, a DCI message scheduling the cooperative transmission, wherein the DCI message indicates a plurality of TCI states; to determine, by the UE, a set of channel parameters using at least one reference signal associated with at least one TCI state of the plurality of TCI states indicated in the DCI message; and to determine, by the UE, a channel estimate using the set of channel parameters.

A two hundred-nineteenth aspect, based on the two hundred-eighteenth aspect, wherein the set of channel parameters is determined for a set of receive antennas at the UE, and wherein the channel estimate is determined for the set of receive antennas receiving the cooperative transmission.

A two hundred-twentieth aspect, based on the two hundred-eighteenth aspect, wherein the set of channel parameters is determined for a set of receive antennas at the UE and the first beam, and wherein the channel estimate is determined for the set of receive antennas and the first set of resources.

A two hundred-twenty-first aspect, based on the two hundred-twentieth aspect, wherein the set of channel parameters is determined from at least one reference signal linked to one of: the at least one TCI state corresponding to the first set of resources; or the at least one TCI state corresponding to the first set of resources and a set of receive antennas at the UE.

A two hundred-twenty-second aspect includes any combination of the two hundred-first aspect through the two hundred-twenty-first aspect.

A two hundred-twenty-third aspect configured for wireless communication may include at least one processor; and a memory coupled to the at least one processor, wherein the at least one processor is configured: to receive, at a base station, a cooperative UE capability report from a plurality of served UEs, wherein the cooperative UE capability report includes UE capabilities and at least an indication of a cooperative UE unit formed by a set of UEs of the plurality of served UEs; to schedule, by the base station, transmission of a set of cooperative transmissions according to the UE capabilities of the cooperative UE unit, wherein the set of cooperative transmissions includes a cooperative transmission for each UE of the set of UEs; to signal, by the base station, a DCI to the set of UEs, wherein the DCI identifies a schedule of the set of cooperative transmissions and a downlink transmission scheme for the transmission of each cooperative transmission of the set of cooperative transmissions; and to transmit, by the base station, each cooperative transmission of the set of cooperative transmissions according to the UE capabilities at the downlink transmission scheme to a corresponding UE of the set of UEs of the cooperative UE unit.

A two hundred-twenty-fourth aspect, based on the two hundred-twenty-third aspect, wherein the UE capabilities reported in the cooperative UE capability report includes one or more of: a cooperative UE capability of the UE; a maximum number of layers supported for processing by the UE; a maximum number of combined layers supported for processing by the UE and the one or more neighboring UEs;

a joint demodulation capability of the UE for two or more cooperative transmissions of the set of cooperative transmissions; a first LLR type capability of the UE; and a second LLR type capability of the UE.

A two hundred-twenty-fifth aspect, based on the two hundred-twenty-fourth aspect, further including configuration of the at least one processor to transmit, by the base station, in response to the cooperative UE capability report including at least the joint demodulation capability, the first LLR type capability, and the second LLR type capability, a cooperative UE configuration signal to each UE of the set of UE from which the cooperative UE capability report is received including the at least the joint demodulation capability, the first LLR type capability, and the second LLR type capability, wherein the cooperative UE configuration signal includes a processing configuration identifying one of: the joint demodulation capability, the first LLR type capability, or the second LLR type capability.

A two hundred-twenty-sixth aspect, based on the two hundred-twenty-fifth aspect, wherein the first LLR type capability includes a capability for generation of a set of direct LLRs calculated from coded bits after demodulation of a downlink transmission transmitted directly to a demodulating UE, and wherein the second LLR type capability includes a capability for generation of a set of combined LLRs calculated from the coded bits after the demodulation of the downlink transmission transmitted directly to the demodulating UE and after the demodulation of an indirect downlink transmission transmitted to another UE of the set of UEs and received by the demodulating UE.

A two hundred-twenty-seventh aspect, based on the two hundred-twenty-sixth aspect, wherein the downlink transmission scheme includes one or more of: a SU-MIMO scheme; a SDM scheme; a NCJT scheme; a TDM scheme; or a FDM scheme.

A two hundred-twenty-eighth aspect, based on the two hundred-twenty-seventh aspect, wherein the downlink transmission scheme is determined to be the SU-MIMO scheme, and wherein the each cooperative transmission transmitted according to the SU-MIMO scheme carries a same set of one or more transport blocks and includes a same set of layers transmitted on a same beam.

A two hundred-twenty-ninth aspect, based on the two hundred-twenty-eighth aspect, wherein the DCI message indicates one of: a single TCI state or a number of TCI states corresponding to a number of UEs of the set of UEs.

A two hundred-thirtieth aspect, based on the two hundred-twenty-seventh aspect, wherein the downlink transmission scheme is determined to be one of: the SDM scheme, the NCJT scheme, the TDM scheme, or the FDM scheme, wherein the each cooperative transmission transmitted according to the downlink transmission scheme carries a different set of coded symbols on a different set of resources transmitted on a different.

A two hundred-thirty-first aspect, based on the two hundred-thirtieth aspect, wherein the different set of coded symbols correspond to a same transport block, wherein the same transport block includes one of: a single redundancy value associated with joint rate matching, or a plurality of redundancy values wherein each redundancy value of the plurality of redundancy values is associated with a separate rate matching.

A two hundred-thirty-second aspect, based on the two hundred-thirtieth aspect, wherein the downlink transmission scheme is determined to be one of: the SDM scheme or the NCJT scheme, and wherein the different set of coded symbols each correspond to a different transport block.

A two hundred-thirty-third aspect, based on the two hundred-thirty-second aspect, wherein, when the set of UEs use the first LLR type, a number of layers of each set of transmission layers for each receiving UE of the set of UEs is no greater than a maximum number of layers supported for processing between the each receiving UE of the set of UEs to which the each cooperative transmission is transmitted, and when the set of UEs use the second LLR type, a sum of the number of layers of each set of transmission layers for each receiving UE of the set of UEs is no greater than a minimum number of layers supported for processing between the each receiving UE of the set of UEs.

A two hundred-thirty-fourth aspect, based on the two hundred-thirtieth aspect, wherein the downlink transmission scheme is determined to be one of: the TDM scheme or the FDM scheme, when the set of UEs use the first LLR type, a number of layers of each set of transmission layers for each receiving UE of the set of UEs is no greater than a maximum number of layers supported for processing between the each receiving UE of the set of UEs to which the each cooperative transmission is transmitted, and when the set of UEs use the second LLR type, a maximum number of layers of each set of transmission layers for each receiving UE of the set of UEs is no greater than a minimum number of layers supported for processing between the each receiving UE of the set of UEs.

A two hundred-thirty-fifth aspect, based on the two hundred-thirtieth aspect, wherein the DCI message indicates a plurality of TCI states.

A two hundred-thirty-sixth aspect includes any combination of the two hundred-twenty-third aspect through the two hundred-thirty-fifth aspect.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    establishing, by a user equipment (UE), a cooperative UE unit with one or more neighboring UEs, wherein the UE operates as the primary UE of the cooperative UE unit;
    determining, by the UE, a downlink transmission scheme for cooperative transmissions from a serving base station;
    receiving, by the UE, a transmission of one or more transport blocks from the serving base station according to the downlink transmission scheme;
    receiving, by the UE, cooperative process data from the one or more neighboring UEs, wherein the cooperative process data is based on a neighboring transmission of the one or more transport blocks by the serving base station as received by the one or more neighboring UEs; and
    processing, by the UE, the transmission and the cooperative process data to decode the one or more transport blocks, wherein the transmission includes a first set of layers and the neighboring transmission includes a second set of layers, wherein each of the first set of layers and the second set of layers are less than or equal to a minimum number of layers between a third set layers supported for processing incoming transmissions by the UE and a fourth set of layers supported for processing incoming transmission by the one or more neighboring UEs of the cooperative UE unit.

2. The method of claim 1, wherein the cooperative process data includes one of:
    a pre-demodulated received transmission corresponding to the neighboring transmission; or
    a set of neighboring log-likelihood ratios (LLRs) resulting from demodulation of the neighboring transmission by the one or more neighboring UEs.

3. The method of claim 2, wherein the processing includes one of:
    jointly demodulating the transmission and the pre-demodulated received transmission into a jointly demodulated transmission and decoding the jointly demodulated transmission to decode the one or more transport blocks; or
    jointly decoding the transmission to decode the one or more transport blocks using the set of neighboring LLRs and a set of LLRs resulting from the UE demodulation of the transmission.

4. The method of claim 3, wherein the set of neighboring LLRs and the set of LLRs correspond to one of: a first LLR type and a second LLR type,
    wherein the first LLR type includes a set of direct LLRs calculated from coded bits after demodulation of a downlink transmission transmitted directly to a demodulating UE, and
    wherein the second LLR type includes a set of combined LLRs calculated from the coded bits after the demodulation of the downlink transmission transmitted directly to the demodulating UE and after the demodulation of an indirect downlink transmission transmitted to one or more UEs neighboring the demodulating UE and received by the demodulating UE.

5. The method of claim 4, further including:
    signaling, by the UE, a cooperative UE capability report to the serving base station, wherein the cooperative UE capability report includes one or more of:
    a cooperative UE capability of the UE;
    a maximum number of layers supported for processing by the UE;
    a maximum number of combined layers supported for processing by the UE and the one or more neighboring UEs;
    a joint demodulation capability of the UE for the transmission and the pre-demodulated received transmission;
    a first LLR type capability of the UE; and
    a second LLR type capability of the UE.

6. The method of claim 5, further including:
    receiving, by the UE, in response to the cooperative UE capability report includes at least the joint demodulation capability, the first LLR type capability, and the second LLR type capability, a cooperative UE configuration signal from the serving base station, wherein the cooperative UE configuration signal includes a processing configuration identifying one of: the joint demodulation capability, the first LLR type capability, or the second LLR type capability.

7. The method of claim 4, wherein the downlink transmission scheme includes one or more of:

a single user-multiple input, multiple output (SU-MIMO) scheme;

a spatial division multiplex (SDM) scheme;

a non-coherent joint-transmission (NCJT) scheme;

a time division multiplex (TDM) scheme; or a frequency division multiplex (FDM) scheme.

8. The method of claim 7, wherein the downlink transmission scheme is determined to be the SU-MIMO scheme, and wherein the transmission and the neighboring transmission each carry the one or more transport blocks and include a same set of layers transmitted on a same beam from the serving base station.

9. The method of claim 8, further including:

receiving, by the UE, a downlink control information (DCI) message scheduling the transmission, wherein the DCI message indicates one of: a single transmission configuration indicator (TCI) state or a number of TCI states corresponding to a number of UEs of the cooperative UE unit;

determining, by the UE, a set of channel parameters corresponding to a set of receive antennas at the UE, wherein the set of channel parameters is determined using a reference signal associated with a TCI state indicated in the DCI message; and determining, by the UE, a channel estimate for the set of receive antennas receiving the transmission, wherein the channel estimated is determined using the set of channel parameters.

10. The method of claim 8, wherein the processing includes the jointly demodulating the transmission and the pre-demodulated received transmission and the decoding the jointly demodulated transmission.

11. The method of claim 8, wherein the processing includes the jointly decoding the transmission using the set of neighboring LLRs and the set of LLRs, wherein the set of neighboring LLRs and the set of LLRs are a first LLR type, wherein a number of the same set of layers is no greater than a minimum number of layers supported for processing incoming transmissions between the UE and the one or more neighboring UEs of the cooperative UE unit.

12. The method of claim 7, wherein the downlink transmission scheme is determined to be one of: the SDM scheme, the NCJT scheme, the TDM scheme, or the FDM scheme, wherein the transmission carries a first set of coded symbols on a first set of resources transmitted on a first beam from the serving base station and the neighboring transmission carries a different set of coded symbols on a different set of resources transmitted on a different beam from the serving base station.

13. The method of claim 12, wherein the first set of coded symbols and the different set of coded symbols correspond to a same transport block, wherein the same transport block includes one of:

a single redundancy value associated with joint rate matching, or a plurality of redundancy values wherein each redundancy value of the plurality of redundancy values is associated with a separate rate matching.

14. The method of claim 12, wherein the downlink transmission scheme is determined to be one of: the SDM scheme or the NCJT scheme, wherein the first set of coded symbols and the different set of coded symbols correspond to a different transport block.

15. The method of claim 12, wherein the processing includes the jointly demodulating the transmission and the pre-demodulated received transmission and the decoding the jointly demodulated transmission, wherein the transmission includes a first transmission component corresponding to a direct transmission from the serving base station to the UE and a second transmission component corresponding to an indirect transmission from the serving base station to the one or more neighboring UEs received by the UE, and the pre-modulated received transmission includes a first neighboring component corresponding to a direct neighboring transmission from the serving base station to the one or more neighboring UEs and a second neighboring component corresponding to an indirect neighboring transmission of the transmission from the serving base station to the UE received by the one or more neighboring UEs.

16. The method of claim 12, wherein the processing includes the jointly decoding the transmission using the set of neighboring LLRs and the set of LLRs, wherein the set of neighboring LLRs and the set of LLRs are one of a first LLR type or a second LLR type.

17. The method of claim 16, wherein the downlink transmission scheme is determined to be one of: the SDM scheme or the NCJT scheme, when the set of neighboring LLRs and the set of LLRs are the first LLR type, a number of the first set of layers for the transmission is no greater than a maximum number of layers supported for processing by the UE and a number of the second set of layers for the neighboring transmission is no greater than a maximum number of neighboring layers supported for processing by a receiving neighboring UE of the one or more neighboring UEs and is different from the number of the first set of layers, and when the set of neighboring LLRs and the set of LLRs are the second LLR type, a sum of the first set of layers for the transmission and the second set of layers for the neighboring transmission is no greater than a minimum number of layers between the maximum number of layers supported for processing by the UE and the maximum number of neighboring layers supported for processing by the one or more neighboring UEs.

18. The method of claim 16, wherein the downlink transmission scheme is determined to be one of: the TDM scheme or the FDM scheme, when the set of neighboring LLRs and the set of LLRs are the first LLR type, a number of the first set of layers for the transmission is no greater than a maximum number of layers supported for processing by the UE and a number of the second set of layers for the neighboring transmission is no greater than a maximum number of neighboring layers supported for processing by a receiving neighbor UE of the one or more neighboring UEs and is different from the number of the first set of layers, and when the set of neighboring LLRs and the set of LLRs are the second LLR type, a maximum number of layers between the first set of layers of the transmission and the second set of layers of the neighboring transmission is no greater than a minimum number of layers between the maximum number of layers supported for processing by the UE and the maximum number of neighboring layers supported for processing by the one or more neighboring UEs.

19. The method of claim 17, further including:

receiving, by the UE, a downlink control information (DCI) message scheduling the transmission, wherein the DCI message indicates a plurality of TCI states;

determining, by the UE, a set of channel parameters using at least one reference signal associated with at least one TCI state of the plurality of TCI states indicated in the DCI message; and determining, by the UE, a channel estimate using the set of channel parameters.

20. The method of claim 19, wherein the set of channel parameters is determined for a set of receive antennas at the UE, and wherein the channel estimate is determined for the set of receive antennas receiving the transmission.

21. The method of claim 19, wherein the set of LLRs and the set of neighboring LLRs includes the second LLR type, wherein the set of channel parameters is determined for a set of receive antennas at the UE and the first beam, and wherein the channel estimate is determined for the set of receive antennas and the first set of resources.

22. The method of claim 21, wherein the set of channel parameters is determined from at least one reference signal linked to one of:

the at least one TCI state corresponding to the first set of resources; or the at least one TCI state corresponding to the first set of resources and a set of receive antennas at the UE.

23. An apparatus configured for wireless communication, the apparatus comprising:

at least one processor; and a memory coupled to the at least one processor, wherein the at least one processor is configured:

to establish, by a user equipment (UE), a cooperative UE unit with one or more neighboring UEs, wherein the UE operates as the primary UE of the cooperative UE unit;

to determine, by the UE, a downlink transmission scheme for cooperative transmissions from a serving base station;

to receive, by the UE, a transmission of one or more transport blocks from the serving base station according to the downlink transmission scheme;

to receive, by the UE, cooperative process data from the one or more neighboring UEs, wherein the cooperative process data is based on a neighboring transmission of the one or more transport blocks by the serving base station as received by the one or more neighboring UEs; and to process, by the UE, the transmission and the cooperative process data to decode the one or more transport blocks, wherein the transmission includes a first set of layers and the neighboring transmission includes a second set of layers, wherein each of the first set of layers and the second set of layers are less than or equal to a minimum number of layers between a third set layers supported for processing incoming transmissions by the UE and a fourth set of layers supported for processing incoming transmission by the one or more neighboring UEs of the cooperative UE unit.

24. The apparatus of claim 23, wherein the cooperative process data includes one of:

a pre-demodulated received transmission corresponding to the neighboring transmission; or a set of neighboring log-likelihood ratios (LLRs) resulting from demodulation of the neighboring transmission by the one or more neighboring UEs.

25. The apparatus of claim 24, wherein the configuration of the at least one processor to process includes configuration of the at least one processor to one of:

jointly demodulate the transmission and the pre-demodulated received transmission into a jointly demodulated transmission and decode the jointly demodulated transmission to decode the one or more transport blocks; or jointly decode the transmission to decode the one or more transport blocks using the set of neighboring LLRs and a set of LLRs resulting from the UE demodulation of the transmission.

26. The apparatus of claim 25, wherein the set of neighboring LLRs and the set of LLRs correspond to one of: a first LLR type and a second LLR type, wherein the first LLR type includes a set of direct LLRs calculated from coded bits after demodulation of a downlink transmission transmitted directly to a demodulating UE, and wherein the second LLR type includes a set of combined LLRs calculated from the coded bits after the demodulation of the downlink transmission transmitted directly to the demodulating UE and after the demodulation of an indirect downlink transmission transmitted to one or more UEs neighboring the demodulating UE and received by the demodulating UE.

27. The apparatus of claim 26, further including configuration of the at least one processor:

to signal, by the UE, a cooperative UE capability report to the serving base station, wherein the cooperative UE capability report includes one or more of:

a cooperative UE capability of the UE;

a maximum number of layers supported for processing by the UE;

a maximum number of combined layers supported for processing by the UE and the one or more neighboring UEs;

a joint demodulation capability of the UE for the transmission and the pre-demodulated received transmission;

a first LLR type capability of the UE; and a second LLR type capability of the UE.

28. The apparatus of claim 27, further including configuration of the at least one processor:

to receive, by the UE, in response to the cooperative UE capability report includes at least the joint demodulation capability, the first LLR type capability, and the second LLR type capability, a cooperative UE configuration signal from the serving base station, wherein the cooperative UE configuration signal includes a processing configuration identifying one of: the joint demodulation capability, the first LLR type capability, or the second LLR type capability.

29. The apparatus of claim 26, wherein the downlink transmission scheme includes one or more of:

a single user-multiple input, multiple output (SU-MIMO) scheme;

a spatial division multiplex (SDM) scheme;

a non-coherent joint-transmission (NCJT) scheme;

a time division multiplex (TDM) scheme; or a frequency division multiplex (FDM) scheme.

\*  \*  \*  \*  \*